US010075500B2

(12) United States Patent
Choi et al.

(10) Patent No.: US 10,075,500 B2
(45) Date of Patent: Sep. 11, 2018

(54) SERVICE METHOD AND SYSTEM USING INSTANCE INTERFACE OF VIRTUALIZATION OBJECT IN INTERNET OF THINGS ENVIRONMENT

(71) Applicant: Korea Advanced Institute of Science and Technology, Daejeon (KR)

(72) Inventors: Jung Kyun Choi, Seoul (KR); Jin Hong Yang, Daejeon (KR); Hyo Jin Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 639 days.

(21) Appl. No.: 14/133,314

(22) Filed: Dec. 18, 2013

(65) Prior Publication Data

US 2015/0058445 A1    Feb. 26, 2015

(30) Foreign Application Priority Data

Aug. 22, 2013  (KR) .................... 10-2013-0099843
Aug. 22, 2013  (KR) .................... 10-2013-0099844

(Continued)

(51) Int. Cl.
  *H04L 29/08*    (2006.01)
  *H04W 4/70*    (2018.01)

(52) U.S. Cl.
  CPC ............ *H04L 67/02* (2013.01); *H04L 67/025* (2013.01); *H04L 67/16* (2013.01); *H04W 4/70* (2018.02); *H04L 67/04* (2013.01)

(58) Field of Classification Search
  CPC ....... H04L 67/02; H04L 67/16; H04L 67/025; H04L 67/04; H04W 4/005
  See application file for complete search history.

(56) References Cited

U.S. PATENT DOCUMENTS

2008/0085699 A1*  4/2008  Hirano ............... H04W 64/003
                                                 455/414.2
2010/0318685 A1*  12/2010 Kraus ............... G07C 9/00944
                                                 709/249

(Continued)

FOREIGN PATENT DOCUMENTS

EP          2482488 A1     8/2012

OTHER PUBLICATIONS

Extended European Search Report issued in European Patent Application No. 14151001.6-1870 dated Jan. 20, 2015.

*Primary Examiner* — Philip Chea
*Assistant Examiner* — Wuji Chen
(74) *Attorney, Agent, or Firm* — Marshall, Gerstein & Borun LLP

(57) ABSTRACT

A service method and system using an instance interface of a virtualization object in an Internet of Things (IoT) environment is disclosed. A service method in an IoT environment may include: displaying a message to another instance using a feeder interface among interfaces included in an instance of a virtualization object about a thing; receiving a message displayed from a feeder interface of the other instance or the thing using a subscriber interface among the interfaces; transferring a message to the other instance or the thing using a controller interface among the interfaces; receiving a message transferred from a controller interface of the other instance using a receiver interface among the interfaces; and interacting with a 3rd party service using an authentication interface among the interfaces.

18 Claims, 23 Drawing Sheets

(30) Foreign Application Priority Data

Aug. 22, 2013 (KR) .......................... 10-2013-0099845
Aug. 22, 2013 (KR) .......................... 10-2013-0099846

(56) References Cited

U.S. PATENT DOCUMENTS

| | | |
|---|---|---|
| 2012/0079092 A1 | 3/2012 | Woxblom et al. |
| 2013/0041997 A1* | 2/2013 | Li .......................... H04W 4/005 709/223 |
| 2013/0057388 A1* | 3/2013 | Attanasio ............... G06Q 50/26 340/10.1 |
| 2013/0151708 A1* | 6/2013 | Shelby .................... H04L 65/40 709/226 |
| 2013/0179926 A1* | 7/2013 | White ................. H04L 12/2809 725/59 |
| 2013/0290305 A1* | 10/2013 | Feng ....................... H04W 4/70 707/722 |
| 2013/0339375 A1* | 12/2013 | Adayikkoth ...... G06F 17/30144 707/754 |
| 2014/0359552 A1* | 12/2014 | Misra ..................... H04L 67/12 717/100 |

\* cited by examiner

FIG. 21

SERVICE METHOD AND SYSTEM USING INSTANCE INTERFACE OF VIRTUALIZATION OBJECT IN INTERNET OF THINGS ENVIRONMENT

CROSS-REFERENCE TO RELATED APPLICATION

This application claims the priority benefit of Korean Patent Application No. 10-2013-0099843, 10-2013-0099844, 10-2013-0099845, and 10-2013-0099846, filed on Aug. 22, 2013, in the Korean Intellectual Property Office, the disclosure of which is incorporated herein by reference.

BACKGROUND

1. Field of the Invention

Embodiments of the present invention relate to a service method and system using an instance interface of a virtualization object in an Internet of Things (IoT) environment.

2. Description of the Related Art

Internet of Things (IoT) has been evolved from an existing Ubiquitous Sensor Network (USN) or Machine to Machine (M2M) communication. While the existing M2M communication has primarily aimed at communication between communication equipment, for example, an end device and a person, IoT has enabled communication between a thing, which is generally visible to users, such as a telephone, a book, and a thermometer, and a person by expanding the scope of things. For example, IoT may indicate a machine-and-space connecting network in which three distributed environmental elements, a person, a thing, and a service, cooperatively establish intelligent relationships, such as sensing, networking, and information processing, without explicit intervention of the person.

In addition to such IoT, a variety of concepts and techniques such as Web of Things (WoT) or Web of Objects (WoO) have been studied and developed. With the development and distribution of the concepts and the techniques, a use of devices, for example, gadget devices, sensor devices, and actuators, via which users can easily connect to the Internet will increase.

In particular, web linkage gadget devices are currently being released in various types. Further, many sensor devices provide a control and monitoring function via a web. Also, terminals to provide a control function via a web may be embedded with a web server function or may include a function that is controllable via an online web service.

However, the aforementioned techniques, devices, and services are individually being managed and thus, a user has inconvenience. For example, even though a user is located around a plurality of devices, the user may need to control each device via an individual access path, for example, a universal resource locator (URL). When a device autonomously provides a web access function, for example, a server function, network linkage and a URL, for example, an Internet Protocol (IP) address for an access of an individual device may be required. In the case of a service that is provided via an exclusive web service, an access right may need to be created for each service and a URL may also be required for each service.

Also, data being individually managed may not be readily used via an organic linkage. For example, in the case of a sensor configured to control a boiler installed in a house, a sensor device may directly gather only limited ambient environment information such as a presence of a person residing in the house, an inside temperature, and a time zone. If the sensor device is capable of additionally using external information, for example, an outside temperature and schedules of a user, a more effective control function may be provided. However, due to data being individually managed for each technique, device, or service, it is difficult to organically link and use the data.

FIG. 1 is a diagram illustrating a service providing method when a device includes an embedded web server according to the related art. A user may access an embedded web server 140 that is embedded in an IoT node 130 of a physical world 120 via an online web 110. Here, the embedded web server 140 is embedded in the IoT node 130 and thus, all of the process logics used to process data created by the IoT node 130 and to process a predetermined function or service are provided to the IoT node 130. Accordingly, it is impossible to provide a service linked to or converged with another service coverage or data of another service at an outside of service coverage provided from the IoT node 130.

FIG. 2 is a diagram illustrating a service providing method when a manufacturer provides a separate online web server according to the related art. Dissimilar to the service providing method of FIG. 1, referring to FIG. 2, a manufacturer or a separate service provider provides a service by constructing a web server 210 via the online web 110. Here, a user may access an IoT node 220 via the web server 210 online. In this case, a module, for example, a Hypertext Transfer Protocol (HTTP) adaptor 230 for communicating with the web server 210 may be included in the IoT node 210. Accordingly, all of the process logics used to process data created by the IoT node 220 and to process a predetermined function or service may be provided online. If necessary, data may exist on the IoT node 210 and a process logic may exist on the web server 210. In this case, issues associated with a web service availability performance of a manufacturer or a separate service provider and lastingness of hosing may arise.

In addition, referring to FIGS. 1 and 2, a user may not access the IoT node 130 including the embedded web service server 140 via the web server 210 and on the contrary, may not access the web server 210 or the IoT node 220 via the embedded web server 140 of the IoT node 130. That is, information cannot be mutually exchanged between object instances and thus, a linkage type or convergence type service may not be provided.

Also, referring to FIG. 2, to provide a service, the IoT node 220 may need to provide the web server 210 with information obtained from a thing, for example, a sensor, or personal information of a user, for example, a location of the user, and thus a privacy of the user may be infringed.

SUMMARY

An aspect of the present invention provides a service providing method and system that may manage different devices or various services through linkage or convergence therebetween and may provide an integrated service in an Internet of Things (IoT) environment, a Web of Things (WoT) environment, or a Web of Objects (WoO) environment.

According to an aspect of the present invention, there is provided a service method in an IoT environment, the method including: displaying a message to another instance using a feeder interface among interfaces included in an instance of a virtualization object about a thing; receiving a message displayed from a feeder interface of the other instance or the thing using a subscriber interface among the interfaces; transferring a message to the other instance or the thing using a controller interface among the interfaces; receiving a message transferred from a controller interface of the other instance using a receiver interface among the interfaces; and interacting with a 3rd party service using an authentication interface among the interfaces.

The displaying may include storing the message in a message queue created for each identifier of a feeder, using the feeder interface, and the receiving of the displayed message may include reading the message stored in the message queue, using the subscriber interface.

Whether the instance is to subscribe to a message of the other instance may be set via a filter element of the subscriber interface, and the message stored in the message queue may be immediately transferred to the instance based on whether the instance is to subscribe to the message, or may be transferred as an input value when running the instance based on a running period of the instance.

Information on a physical interface used to receive the message may be stored in advance via an information element associated with the thing, and the subscriber interface may receive the message from the thing based on information on the physical interface.

In response to receiving the message using the receiver interface, an operation associated with the message may be executed regardless of a running period of the instance.

Information on a receiver interface of the other instance may be set via a filter element of the controller interface, and the controller interface may transfer the message to the other instance based on information on the receiver interface set in the filter element.

Authentication information on different accounts of different 3rd party services or an identical 3rd party service may be settable for each instance.

According to another aspect of the present invention, there is provided a service system in an IoT environment, the service system including: at least one storage unit configured to store at least one program; and at least one processor. Based on a control of the at least one program, the at least one processor may be configured to perform: a process of displaying a message to another instance using a feeder interface among interfaces included in an instance of a virtualization object about a thing; a process of receiving a message displayed from a feeder interface of the other instance or the thing using a subscriber interface among the interfaces; a process of transferring a message to the other instance or the thing using a controller interface among the interfaces; a process of receiving a message to be transferred from a controller interface of the other instance using a receiver interface among the interfaces; and a process of interacting with a 3rd party service using an authentication interface among the interfaces.

According to embodiments of the present invention, it is possible to manage different devices or various services through linkage or convergence therebetween and to provide an integrated service in an IoT environment, a WoT environment, or a WoO environment.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 21 is a diagram illustrating an example of an additional setting for a mashup instance and an external service authentication request according to still another embodiment of the present invention;

DETAILED DESCRIPTION

Figure 1:
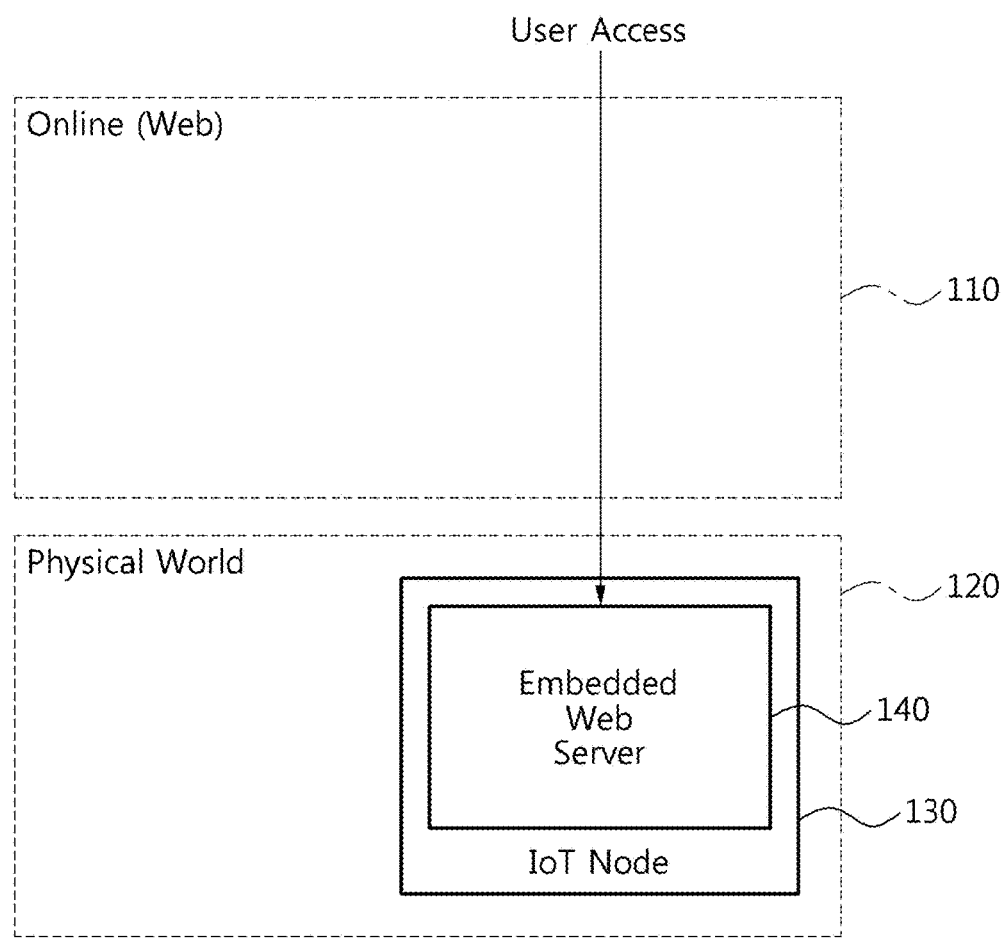
FIG. 1 is a diagram illustrating a service providing method when a device includes an embedded web server according to the related art.
Figure 2:
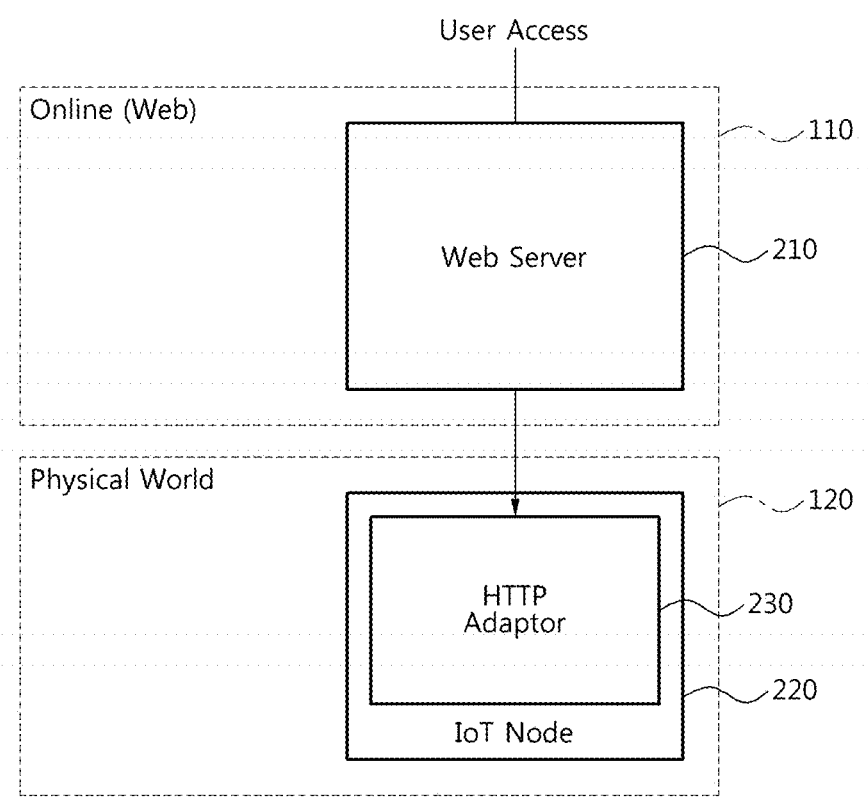
FIG. 2 is a diagram illustrating a service providing method when a manufacturer provides a separate online web server according to the related art.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

Hereinafter, embodiments of the present invention are described in detail with reference to the accompanying drawings.

Figure 3:
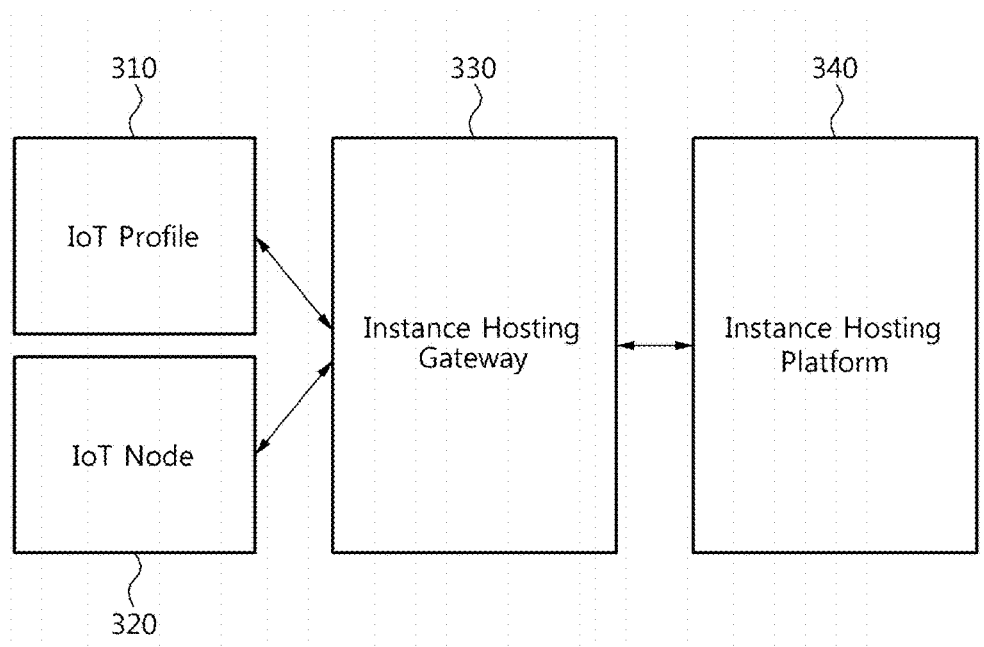
FIG. 3 is a diagram illustrating an example of an entire system configuration for instance hosting according to an embodiment of the present invention.

FIG. 3 is a diagram illustrating an example of an entire system configuration for instance hosting according to an embodiment of the present invention. An Internet of Things (IoT) profile 310, an IoT node 320, an instance hosting gateway 330, and an instance hosting platform 340 are illustrated in FIG. 3.

The IoT profile 310 may refer to information on the IoT node 320 that is provided online from a manufacturer or a developer of the IoT node 320. For example, the IoT profile 310 may refer to an eXtensible Markup Language (XML) file that is created when the manufacturer or the developer processes information on the IoT node 320 based on a predefined XML scheme, in order to minimize the inconvenience of a user having to manually input data to the instance hosting gateway 330.

The IoT profile 310 may include a description about the IoT node 320 and an identifier (ID) of a process in which an operation of the IoT node 320 is described. Here, the ID may be, for example, a universal resource locator (URL) of a document including information on the process. For example, a process may be provided online using a separate file, such as extension '.js' file and an ID of the process may be a URL indicating a location of the file. The following Table 1 shows an example of information that may be included in the IoT profile 310.

TABLE 1

| Name | Description | Note |
| --- | --- | --- |
| IoTProfileID | A unique URL corresponding to a location of an IoT profile | Expressed in a URI format. |
| IoTProfileVer | A version of an IoT Profile | Expressed in a form of 'V' + 'number'. |
| IoTProfileDesc | A description of an IoT Profile | |
| IoTInput | An input value of an IoT Node (not required for an instance node that does not provide an input function), and information used to create RESTful API | Data support format JSON XML |
| IoTOutput | An output value of an IoT Node and information used to create RESTFUL API | |
| IoTProcessID | A process ID of an IoT Node | Expressed in a URI format. |

The IoT node 320 may correspond to a thing in an IoT environment, such as a sensor device, and may provide ID information of the IoT node 320, such as 'IoTNodeID'. When the IoT node 320 is a non-constraint (NC) node such as a smart device, the IoT node 320 may directly provide the IoT profile 310.

For clarity of description, FIG. 3 illustrates a single IoT node 320 and a single IoT profile 310 about the IoT node 320. However, a plurality of IoT nodes and a plurality of IoT profiles about the plurality of IoT nodes may be used in an IoT environment. Also, a plurality of IoT profiles may be provided with respect to a single IoT node.

An IoT node and an instance may be provided in various forms, such as 1:1, 1:N, and N:M. Also, an instance may be provided in a form of a process regardless of an absence of a physical IoT node, and may be created and linked through linkage between processes, instead of being linked to a predetermined device such as a mashup process. For example, even though an instance is not connected to a separate IoT node, an instance may be created in the instance hosting gateway 330 by deploying and executing a predetermined process in the instance hosting gateway 330. In the present specification, an example of connecting, to an individual instance, and thereby processing a message received from an IoT node through communication between instance hosting gateways according to embodiments of the present invention. However, as described above, at least one IoT node may be present in a form of a process, for example, a process node, instead of being a physical device.

Further, a process of receiving information from a plurality of sensors without using a physical device, such as a sensor device or an actuator, and providing only a linkage function with another web service or application online may be provided. For example, in the case of a service that provides a predetermined result by analyzing information of sensors or state information of a predetermined application used by a user, a separate processing environment may be required to run the service. In this example, an instance hosting gateway according to embodiments of the present invention may also provide the processing environment.

Referring to FIG. 3, the instance hosting gateway 330 may connect, to an individual instance, and thereby process a message received from the IoT node 320, and may be linked to, for example, interact with an external service in response to a service request. The instance hosting gateway 330 may be provided to an access point (AP) environment for the IoT node 320. For example, the instance hosting gateway 330 may include an instance application server portion in which the instance hosting gateway 330 is included in an AP and operates as a web application server (WAS) and a portion in which the instance hosting gateway 330 is included in an AP in a form of software, hardware, or a combination of software and hardware, for example, a module included in an operating system (OS) of the AP in a form of software and a module included in a form of hardware for communication with the IoT node 320.

For example, the instance hosting gateway 330 may be included in an AP installed in a predetermined space, for example, a house, and may serve to receive and process data by communicating with things, for example, IoT nodes, included in the predetermined space and may serve to provide a linkage service with an external service.

Here, when the new IoT node 320 is found, the instance hosting gateway 330 may download and install the IoT profile 310. For example, a user may input a location of an XML file corresponding to the IoT profile 310 into the instance hosting gateway 330, and the instance hosting gateway 330) may download and install the XML file based on the input location.

The instance hosting gateway 330 is described in more detail with reference to FIGS. 4 through 7.

The instance hosting platform 340 may provide a mashup function and a mutual linkage function between instances.

For example, the instance hosting gateway 330 may provide, to an outside, a function to be provided in an API format in response to a request of a user or a service and thereby communicate with the instance hosting platform 340 for a linkage, for example, an interaction with an external service. Herein, the terms "interact/interaction" and "link/linkage" may be interchangeably used throughout.

Figure 4:
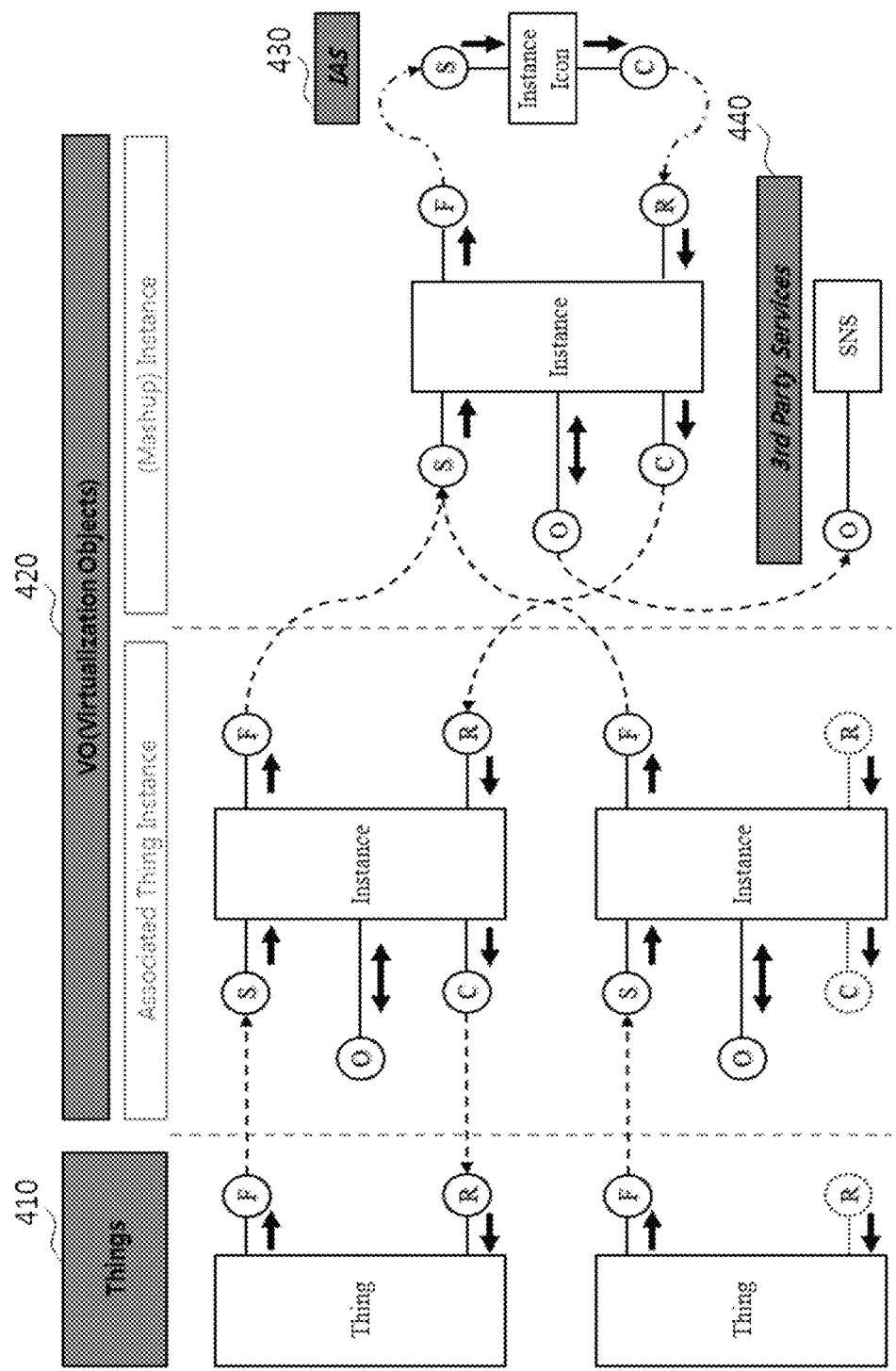
FIG. 4 is a diagram illustrating interfaces of an instance according to an embodiment of the present invention.

FIG. 4 is a diagram illustrating interfaces of an instance according to an embodiment of the present invention. Referring to things 410 and virtualization objects (VOs) 420, an interface is required for a connection between a virtualization object and a thing and a connection between a virtualization object and another virtualization object. The present embodiment describes examples of providing a total of five instance interface functions for an effective and explicit use of an interface.

Information on an individual interface may be clearly described in an instance profile for each instance and thereby be used. An instance manage that may be included in the instance hosting gateway 330 of FIG. 3 may provide an associated function based on information on a corresponding instance. FIG. 4 illustrates associated thing instances associated with the respective things 410 and a mashup instance for an interaction between instances. Here, the mashup instance may enable a linkage, for example, an interaction between an instance application server (IAS) 430 and a 3rd party service 440.

The IAS 430 may serve to perform a web application server function of the instance hosting gateway 330. Here, functions provided via the instance application server 430 may also be provided to a web interface. Also, the 3rd party service 440 may refer to various external services such as a social network service (SNS).

Figure 5:
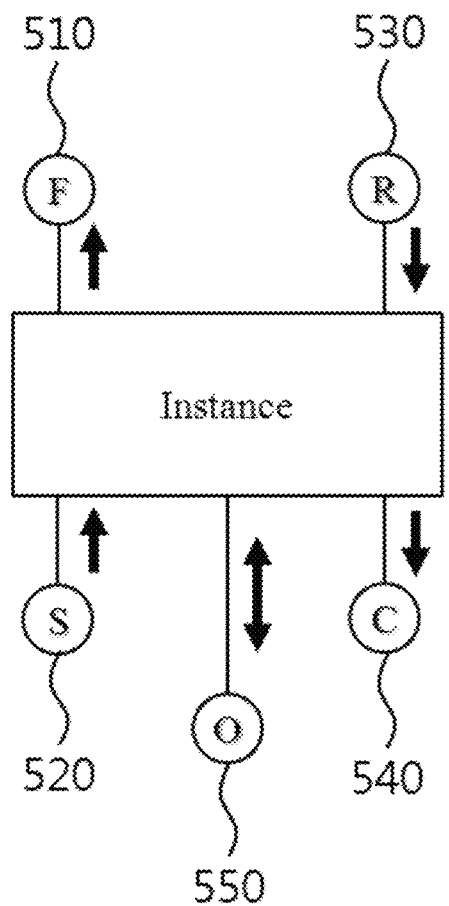
FIG. 5 is a diagram illustrating functions of instances of an instance according to an embodiment of the present invention.

FIG. 5 is a diagram illustrating functions of instances of an instance according to an embodiment of the present invention. In the case of instances corresponding to the virtualization objects (VOs) 420 of FIG. 4, data may be transmitted and received (1) between a thing and an instance, (2) between an instance, and another instance, (3) between an external service, for example, the 3rd party service 440 and an instance, and (4) between an instance hosting (IH) application function, for example, an instance icon of FIG. 4 and an instance using five interfaces provided from the instance manager.

An F 510 representing a feeder may include an interface for displaying information that an instance is to provide to another instance or an external service. Here, the F 510 may be configured to store information to be fed in a message queue of an instance, instead of directly transferring a message, and may be used in the following cases (1) through (3):

(1) A case of reading a message received from a device, for example, a thing and transferring the message to another service or another instance.

(2) A case of displaying a predetermined state value within an instance or displaying a value to be transferred to an external service, for example, the $3^{rd}$ party service 440.

(3) A case of setting a representative value, for example, a representative attribute value, to be displayed for a user using an instance icon, for example, the instance icon of the instance application server 430 on an instance list among state values of an instance.

An S 520 representing a subscriber may include an interface for receiving information from a thing or a feeder of another instance, and may be used in the following cases (4) and (5):

(4) A case of receiving information from a device, for example, a thing. In this case, information on a physical interface of a thing that a network adaptor included in the instance hosting gateway 330 is to listen to may be described in an associatedThingInformation element.

(5) A case of subscribing to information on a feeder of another instance, for example, a case of using a value to be displayed to a feeder interface of the other instance. In this case, when subscribing to information on the feeder of the other instance, it is possible to subscribe to information via an interface satisfying a condition defined in a filter.

An R 530 representing a receiver may include an interface used when an instance receives a message from a controller of another instance, and may be used in the following cases (6) through (8):

(6) A case of receiving information from another instance, for example, a case of receiving information from a controller interface of the other instance.

(7) A case of receiving a representative control value of an instance icon if a representative attribute value is set on a feeder, for example, a case of processing a direct control of a user.

(8) A case of receiving a message from an external service, for example, the 3rd party service 440, for example, a case of receiving user state information of a calendar service.

A C 540 representing a controller may include an interface used when an instance transfers information from an outside, and may be used in the following cases (9) and (10):

(9) A case of transferring a message, for example, a control message to a device, for example, a thing, for example, a case of transferring a message to a device, for example, a thing in which an associatedThingInformation element is set.

(10) A case of transferring a message to another instance, for example, a case of transferring data using a triggering method instead of entering a receiver interface message queue of the other instance.

An O 550 representing an authentication (OAuth) may include an interface used when an instance interacts with a 3rd party service, and may be used in the following cases (11) and (12):

(11) A case of transferring a message to a 3rd party service after an authentication is completed.

(12) A case of receiving a message, for example, a query from a 3rd party service.

Here, the aforementioned cases (8) and (12) correspond to a case of receiving a message from an external service. A message from the external service may be received using the R 530 and may also be received using the O 550, depending on embodiments.

An instance according to embodiments of the present invention may create a message queue with respect to individual interface information, and a predetermined number of messages, for example, 100 messages may be stored in a message queue for each interface. Even though a corresponding instance is abnormally terminated, for example, when an instance switches to an error state, stored messages may remain. When the instance switches to a normal run state, the stored messages may be used. Here, messages received when the instance is in the error state may be stored in a message queue of the instance regardless of a state of the instance. It may correspond to a subscriber interface or a receiver interface.

Hereinafter, interfaces included in an instance are described in more detail.

1. A subscriber may refer to an interface used when an instance receives and subscribes to a message from a machine device, for example, a thing and a feeder interface of another instance. When receiving a message from a thing, a corresponding subscriber may need to describe information on a physical interface required for receiving the message in an 'associatedThingInformation' element. Here, the required information may include a variety of information used for adaptation of a physical interface of a basic device. Also, when receiving a message from another instance, a corresponding subscriber may need to describe information on a feeder interface of the other instance in a 'Filter' element. Information on the feeder interface may be described in the 'Filter' element by inputting information of an instance to be subscribed to while registering a corresponding instance using, for example, an instance wizard. In this example, when a trigger attribute is set to 'true' and a value of a corresponding feeder is created, an instance manager may immediately call a subscriber interface that subscribes thereto. The above operation may be performed regardless of an 'InstanceRunningPeriod' value.

Available attributes of the subscriber may be expressed as the following Table 2.

TABLE 2

<xs:element name="subscriber"> <xs:complexType>
<!-- used as an ID for identifying an inteface for each instance. A maximum of three digits can be used.-->
<xs:attribute name="id" type="xs:unsignedShort" />
<!-- NAME can be used as information for easily identifying an instance, and also can be used as information to be provided to a user for identifying
an interface of a corresponding instance when a connection between instances is performed.-->
<xs:attribute name="name" type="xs:string" />
<!-- set based on a presence of an immediate reaction in a case in which a corresponding is created when subscribing to another instance. An instance manager monitors whether triggering of a feeder list is set and then immediately transfers data.-->
<xs:attribute name="trigger" type="xs:boolean" />
</xs:complexType> </xs:element>

Also, available attributes of a filter within the subscriber may be expressed as the following Table 3.

TABLE 3

<xs:element name="filter"><xs:complexType>
<!-- in the case of subscribing to a feeder of another instance, only an interface satisfying a condition defined in a filter can be subscribed to -->
<xs:attribute name="instanceId" type="xs:string"/>
<!-- inputs an ID value (unique value) of an instance to be subscribed to -->
<xs:attribute name="feederId" type="xs:unsignedShort"/>
<!-- inputs an unique ID of a feeder within an instance to be subscribed to -->
<xs:attribute name="minVersion" type="xs:string"/>
<!-- inputs a minimum value of a support version of an instance to be subscribed to -->
<xs:attribute name="maxVersion" type="xs:string"/>
<!-- inputs a maximum value of a support version of an instance to be subscribed to -->
</xs:complexType></xs:element>
</xs:sequence>

2. A feeder refers to an interface used when an instance displays information to another instance. Based on a setting of an interface being subscribed to, a value may be immediately transferred, or may be transferred as an input value of another instance when the other instance runs. Here, when an instance manager creates a message queue for each individual feeder ID and stores data, for example, a message in the message queue, the stored data may be read via a subscriber interface.

Regarding a message transfer method of a feeder, a method of reading a message from the feeder may be classified into a method based on whether a triggering is set on a subscriber interface and a method of transferring an input value based on whether an instance being subscribed to runs.

In the case of a subscriber interface in which a triggering is set with respect to a corresponding feeder, a value of a feeder that the subscriber interface is subscribing to may be called when the value is registered. Otherwise, when another instance subscribing to the feeder runs, the instance manager may read data and may transfer the read data as an input value. Here, even though the instance manager has read and fetched a value of the feeder, data may not be immediately erased from the message queue. The message queue may store a predetermined number of cases, for example, 100 cases for each interface. Even though a corresponding instance is abnormally terminated, a stored value may remain.

The feeder may use attributes expressed as the following Table 4. When 'representative' indicating a representative value is set to 'true', a unit interacting with corresponding data, such as temperature degrees or Kcal, may be displayed on a list page of the instance manager having to designate a unit.

TABLE 4

<xs:attribute name="id" type="xs:unsignedShort" />
<!-- can be used as an ID for identifying an interface for each instance. A maximum of three digits can be used.-->
<xs:attribute name="name" type="xs:string" />
<!-- NAME can be used as information for easily identifying an instance, and also can be used as information to be provided to a user for identifying
an interface of a corresponding instance when a connection between instances is performed.-->
<xs:attribute name="unit" type="xs:string" />
<!-- used to define a value of data transmitted and received via a corresponding interface.-->
<xs:attribute name="representative" type="xs:boolean" />
<!-- refers to a portion of setting a representative value and thus, if a corresponding value is set, the corresponding value is output to an instance
icon on an instance list page.-->

Figure 6:
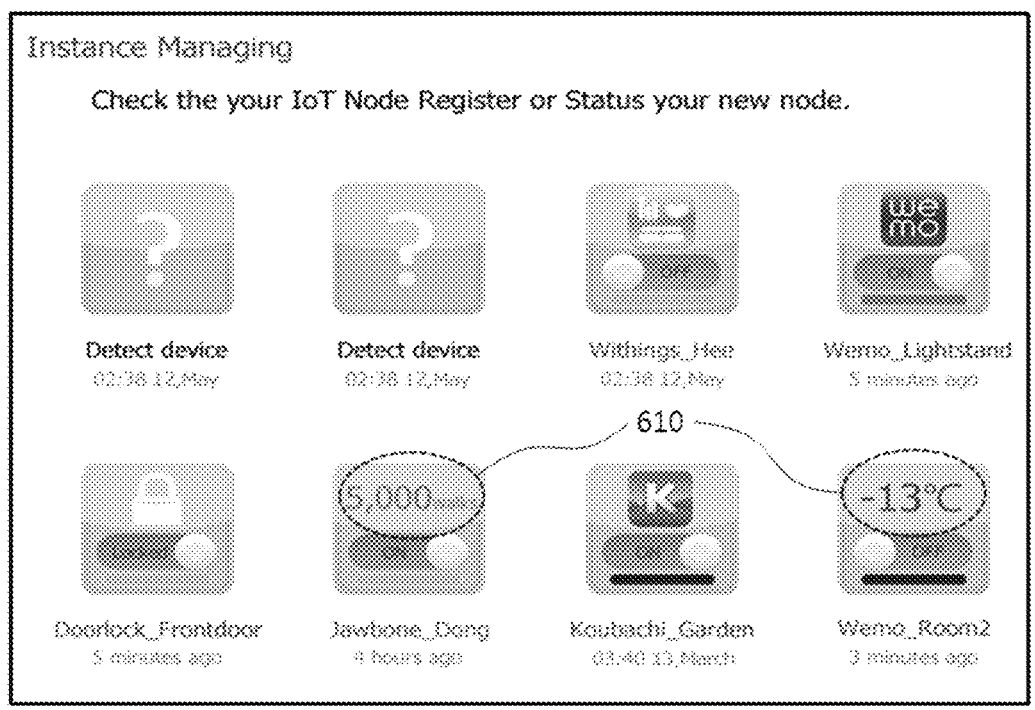
FIG. 6 is a diagram illustrating an example of an instance list page according to an embodiment of the present invention.

FIG. 6 is a diagram illustrating an example of an instance list page according to an embodiment of the present invention. Referring to FIG. 6, a portion of a page including a plurality of instance icons is displayed on a screen 600. Here, circles 610 indicated using dotted lines express examples in which a representative attribute of a feeder interface is set on an instance icon.

3. A receiver refers to an interface for receiving a call of a message from another instance. Information may be transferred via a controller interface of the other instance. A message transferred from the other instance may be directly transferred to a receiving instance and a triggering, for example, execution of the corresponding instance may be performed. Such triggering may be performed regardless of whether 'runningPeriod' that indicates a running period of the instance having received the message is set.

The receiver may use attributes expressed as the following Table 5. When 'representative' indicating a representative value is set to 'true', a button for controlling a corresponding instance may be created on a list page of the instance manager having to designate a unit.

TABLE 5

```
<xs:attribute name="id" type="xs:unsignedShort" />
<!-- can be used as an ID for identifying an interface for each instance.
A maximum of three digits can be used.-->
<xs:attribute name="name" type="xs:string" />
<!-- NAME can be used as information for easily identifying an instance,
and also can be used as information to be provided to a user for identifying
an interface of a corresponding instance when a connection between
instances is performed.-->
<xs:attribute name="unit" type="xs:string" />
<!-- used to define a value of data transmitted and received via a
corresponding interface.-->
<xs:attribute name="representative" type="xs:boolean" />
<!-- refers to a portion of setting a representative value and thus, if a
corresponding value is set, the corresponding value is output to an
instance
icon on an instance list page.-->
```

Referring again to FIG. 6, a button for controlling an instance corresponding to an instance icon, such as "ON", "OFF", and "Locked", is created on an activated icon among icons displayed on the screen 600 of FIG. 6.

4. A controller may include an interface used when an instance transfers a message to another instance or a device, for example, a thing. The controller may call a corresponding instance using a direct transfer method in order to transfer a message to another instance. The message may be transferred to the corresponding instance via a receiver interface. For example, regardless of whether 'runningPeriod' of the instance having received the message is set, a transfer of the message may be triggered. When transferring the message to the device, for example, the thing, the controller may immediately transfer the message via a network adaptor.

When transferring a message to another instance, information on a receiver interface of the other instance needs to be described in a filter element. Information described in the filter element may be expressed as the following Table 6.

TABLE 6

```
<xs:element name="filter"><xs:complexType>
<!-- in the case of transferring a message to a receiver of another instance,
the message can be transferred only to an interface satisfying a condition
defined in a filter.-->
<xs:attribute name="instanceId" type="xs:string"/>
<!-- an ID value (unique value) of an instance to which a message is to
be transferred.-->
<xs:attribute name="receiverId" type="xs:unsignedShort"/>
<!-- an ID value (unique value) of a receiver interface within an instance
to which a message is to be transferred .-->
<xs:attribute name="minVersion" type="xs:string"/>
<!-- inputs a minimum value of a support version of an instance to which
a
message is to be transferred -->
<xs:attribute name="maxVersion" type="xs:string"/>
<!-- inputs a maximum value of a support version of an instance to which
a message is to be transferred -->
</xs:complexType></xs:element>
```

Also, the controller may have attributes expressed as the following Table 7.

TABLE 7

```
<xs:attribute name="id" type="xs:unsignedShort" />
<!-- used as an ID for identifying an interface for each instance. A
maximum of three digits can be used -->
<xs:attribute name="name" type="xs:string" />
<!-- NAME can be used as information for easily identifying an instance,
and also can be used as information to be provided to a user for identifying
```

TABLE 7-continued

```
an interface of a corresponding instance when a connection between
instances is performed.-->
</xs:complexType> </xs:element>
```

5. An authentication interface (hereinafter, 'OAuth') may include an interface used when an instance interacts with an external 3rd party service through an OAuth based authentication. To this end, a user may need to initially perform an OAuth account authentication of a target service that the user desires to connect to. The OAuth account authentication may be performed separately using an instance wizard or an OAuth menu.

Authentication information of OAuth for interaction may be set for each individual instance, or the setting may be cancelled. For example, each of a plurality of SNS accounts may be set or cancelled in a different manner for each instance.

An instance may determine whether a corresponding OAuth interaction is essential based on the necessity of OAuth. Corresponding information may be expressed using a 'required' attribute. When the 'required' attribute is set to 'true' and when the OAuth interaction is abnormally performed, the corresponding instance may not enter into a running state and thus, may remain in an error state after being registered.

The authentication interface, that is, OAuth may have attributes expressed as the following Table 8.

TABLE 8

```
<xs:element name="oAuth"> <xs:complexType>
<!-- used as an ID for identifying an interface for each instance. A
maximum of three digits can be used.-->
<xs:attribute name="id" type="xs:unsignedShort" />
<!-- inputs a service name for an interaction with OAuth. For example,
inputs 'twitter' for Twitter, inputs 'facebook' for Facebook, and
inputs 'google' for Google.-->
<xs:attribute name="serviceName" type="xs:string" />
<!-- describes an explanation to be informed to a user regarding
information to be used in an OAuth account to be linked. For example,
which information is being accessed for which purpose is described.-->
<xs:attribute name="description" type="xs:string" />
</xs:complexType> </xs:element>
```

Hereinafter, a data type of an instance supported by a system for instance hosting is described. When transferring a message between instances, the data type of the instance may be further used to express a unit indication symbol displayed on an instance icon, in addition to clarity of processing based on the data type.

The data type of the instance may refer to a data type of unit information that is provided for each interface of the instance. To further facilitate the development and enable a user to intuitively use information, the system for instance hosting may provide a basic data type, for example, World Wide Web Consortium (3WC) and Web Interface Definition Language (Web IDL), and may also provide a separate data set that is more frequently used when using general IoT devices. For example, the data type may be provided as expressed as the following Table 9.

TABLE 9

| Data Type | Description | Icon Display |
|---|---|---|
| percent | percentage | % |
| onoff | on/off | Control Icon |

TABLE 9-continued

| Data Type | Description | Icon Display |
|---|---|---|
| celsius | Celsius | ° C. |
| lockunlock | lock/unlock | Control Icon |
| lux | unit of illumination | Lux |
| kcal | unit of calories | Kcal |
| Cal | unit of calories | Cal |
| steps | step | Steps |
| floor | floor | F |
| kilogram | unit of mass | KG |
| gram | unit of mass | G |
| hour | unit of time | H |
| minute | unit of time | min |

In addition to examples of Table 9, various data types, such as millimeter (mm) used to indicate an amount of rainfall, may be used.

Instance hosting may propose a schema structure for gathering information required to create a virtual object of a business logic and a thing. A primary configuration may include an instance information register unit, a description unit of network adaptor information used to interact with a virtual objectification of a thing, a description unit of interface information defined for each instance, and a JavaScript code description unit. For example, the contents thereof may be provided as expressed as the following Table 10.

TABLE 10

```
<!-- use an instance tag as a top element -->
<xs:element name="instance">
<xs:complexType><xs:sequence>
<!-- a unique ID including a combination of numbers, English characters, and '_', with a
maximum length of 32 characters, and is issued via a predetermined webpage. In the case
of an issuance, basic information associated with the instance is registered. An instance
ID value indicates a representative name value of a corresponding instance profile.-->
<xs:element name="instanceId">
<xs:simpleType> <xs:restriction base="xs:string">
<xs:pattern value="[a-zA-Z0-9_]+"/>
<xs:maxLength value="32"/>
</xs:restriction> </xs:simpleType>
</xs:element>
<!-- a version with a maximum length of 16 characters -->
<xs:element name="instanceVersion">
<xs:simpleType> <xs:restriction base="xs:string">
<xs:pattern value="[0-9](.[0-9])+"/>
<xs:maxLength value="16"/>
</xs:restriction> </xs:simpleType>
</xs:element>
<!-- representative URL having information of an instance -->
<xs:element name="instanceDetailURL" type="xs:string"/>
<xs:element name="instanceDescription" type="xs:string" />
<!-- a physical location of a representative icon to be used for and after registering an
instance. An icon needs to be provided in PNG and JPG formats and a size thereof
supports a maximum of 96by96.-->
<xs:element name="instanceIconURL" type="xs:string" minOccurs="0" />
<!-- A running period of an instance uses an integer of −1 or 1 or more and follows a size
of a maximum decimal value. -->
<xs:element name="instanceRunningPeriod" type="xs:decimal" />
<!-- in the case of virtually objectifying a thing, network adaptor associated information
needs to be described in an associatedThingInformation element in order to describe an
interaction interface with the thing.-->
<xs:element     name="associatedThingInformation">    <xs:complexType>    <xs:all
minOccurs="1">
<!-- inputs name information of a thing -->
<xs:element name="thingName" type="xs:string" />
<!-- inputs representative image information of a thing -->
<xs:element name="thingImageURL" type="xs:string" />
<!-- inputs additional information of a thing -->
<xs:element name="thingDescription" type="xs:date" />
<!-- virtualization of a physical interface for providing or transmitting information of a
thing -->
<xs:element name="feederInformation"> <xs:complexType>
<!-- information used to connect a message transferred from a thing to a subscriber
interface of an instance. A value of a corresponding attribute describes an ID value of the
subscriber interface desired to be connected to. -->
<xs:attribute name="connectedInterfaceId" type="xs:unsignedShort"/>
<!-- inputs information of an actual physical interface, for example, ZigBee and WiFi, to
be used for interaction with a thing -->
<xs:attribute name="interface" type="xs:string"/>
<!-- a MAC address value used to transmit information of a thing for interaction with the
thing -->
<xs:attribute name="src_mac_addr" type="xs:string"/>
<!-- an IP address value of a thing used for interaction with the thing -->
<xs:attribute name="src_ip_addr" type="xs:string"/>
<!-- a destination IP address value of a message transferred by a thing when interacting
with the thing, for example, information used when hooking a message via a network
adaptor -->
<xs:attribute name="dst_ip_addr" type="xs:string"/>
<!-- a TCP port value of a thing when interacting with the thing -->
```

TABLE 10-continued

```
<xs:attribute name="src_tcp_port" type="xs:string"/>
<!-- a destination TCP port value of a message transferred by a thing when interacting
with the thing, for example, information used when hooking a message via a network
adaptor -->
<xs:attribute name="dst_tcp_port" type="xs:string"/>
<!-- a UDP port value of a thing when interacting with the thing -->
<xs:attribute name="src_udp_port" type="xs:string"/>
<!-- a destination UDP port value of a message transferred by a thing when interacting
with the thing, for example, information used when hooking a message via a network
adaptor -->
<xs:attribute name="dst_udp_port" type="xs:string"/>
<!-- an address value for an HTTP request when using an HTTP message communication
method for interaction with a thing -->
<xs:attribute name="http_request_uri" type="xs:string"/>
</xs:complexType> </xs:element>
<!-- virtualization of a physical interface for receiving information of a thing -->
<xs:element name="receiverInformation"> <xs:complexType>
<!-- information used to connect a message to be received by a thing to a controller
interface of an instance. A value of a corresponding attribute describes an ID value of the
controller interface desired to be connected to. -->
<xs:attribute name="connectedInterfaceId" type="xs:unsignedShort"/>
<!-- inputs information of an actual physical interface, for example, ZigBee and WiFi, to
be used for interaction with a thing -->
<xs:attribute name="interface" type="xs:string"/>
<!-- a MAC address value of an interface to be received by a thing when interacting with
the thing -->
<xs:attribute name="dst_mac_addr" type="xs:string"/>
<!-- an IP address value of a thing when interacting with the thing -->
<xs:attribute name="src_ip_addr" type="xs:string"/>
<!-- a destination IP address value of a message transferred by a thing when interacting
with the thing, for example, information used when hooking a message via a network
adaptor -->
<xs:attribute name="dst_ip_addr" type="xs:string"/>
<!-- a TCP port value of a thing when interacting with the thing -->
<xs:attribute name="src_tcp_port" type="xs:string"/>
<!-- a destination TCP port value of a message transferred by a thing when interacting
with the thing, for example, information used when hooking a message via a network
adaptor -->
<xs:attribute name="dst_tcp_port" type="xs:string"/>
<!-- a UDP port value of a thing when interacting with the thing -->
<xs:attribute name="src_udp_port" type="xs:string"/>
<!-- a destination UDP port value of a message transferred by a thing when interacting
with the thing, for example, information used when hooking a message via a network
adaptor -->
<xs:attribute name="dst_udp_port" type="xs:string"/>
<!-- an address value for an HTTP request when using an HTTP message communication
method for interaction with a thing -->
<xs:attribute name="http_request_uri" type="xs:string"/>
</xs:complexType> </xs:element>
</xs:all> </xs:complexType> </xs:element>
```

The aforementioned instance manager may use, for example, a V8 based JavaScript engine to provide a running environment of virtual objectification, and may include a message router and an instance pool for instance hosting.

Figure 7:
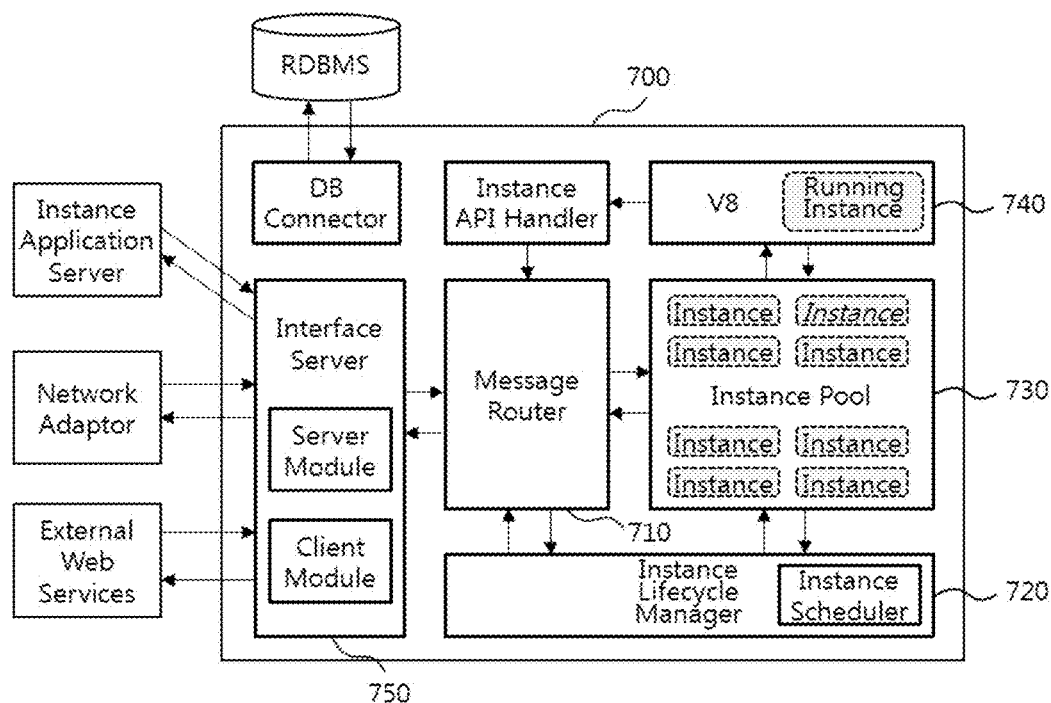
FIG. 7 is a block diagram illustrating an instance manager according to an embodiment of the present invention.

FIG. 7 is a block diagram illustrating an instance manager 700 according to an embodiment of the present invention. The instance manager 700 may include, as primary modules associated with creating and running an instance, a message router 710 configured to route an input/output (I/O) message, an instance lifecycle manager 720 configured to manage and schedule a lifecycle of an instance, an instance pool 730 configured to perform instance pooling, and an engine (V8) 740 configured to provide an instance running environment.

An interface server 750 may provide an interfacing function between the instance manager 700 and each of another module and an external service, and may include a server module configured to receive and process a request and a client module configured to transfer a message to another module and an outside.

Hereinafter, functions of a server interface via the server module of the interface server 750 are described as follows:

An instance state query function refers to a function capable of verifying state information of a predetermined instance using an HTTP request when an instance application server and a network adaptor are to verify a state of an instance being executed on the instance manager 700.

An instance state control function refers to a function capable of switching a state of a predetermined instance to a run, stop, or suspend state using an HTTP request when the instance application server changes the state of the corresponding instance.

An instance deploy control function refers to a function capable of transferring information on a corresponding instance to the instance manager 700 using an HTTP request when deploying a new instance or undeploying an existing instance via the instance application server.

A thing feed control function refers to a function capable of dispatching a message of a physical thing received by the network adaptor to a corresponding instance in a format of an HTTP request.

An instance state control for representative controller function refers to a function capable of transferring a message in a format of an HTTP request when an instance state is changed by controlling a representative value of a predetermined instance via the instance application server.

A function of a client interface via the client module of the interface server 750 may include a function capable of transferring a message using the client interface in response to a request of a predetermined instance for connecting to an external service, if the predetermined instance uses an OAuth authentication service.

Also, an instance API handler of FIG. 7 may manage an open API to be provided to an outside in association with an instance. A database (DB) connector may be used for a connection to a relational DB management system (RDBMS).

Figure 8:
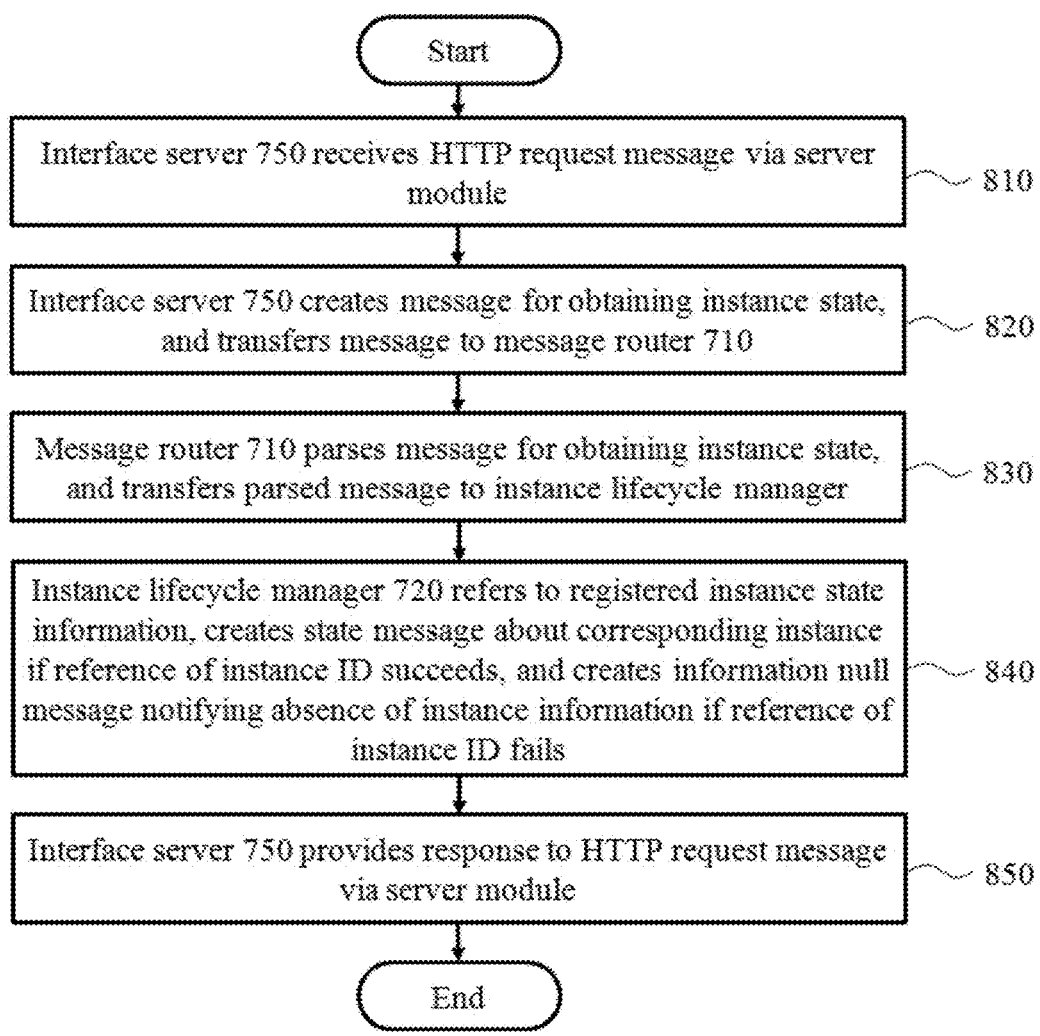
FIG. 8 is a flowchart illustrating an instance state query function according to an embodiment of the present invention.

FIG. 8 is a flowchart illustrating an instance state query function according to an embodiment of the present invention. Hereinafter, the instance state query function is described with reference to FIGS. 7 and 8. The instance application server may inquire the instance manager 700 using an instance state query function in order to provide state information of an individual instance. The instance lifecycle manager 720 may serve to manage a state of an individual instance on the instance manager 700 being executed. The instance lifecycle manager 720 may return state information of a corresponding instance based on an instance ID value. State information of an instance may have a state value, such as run, suspend, stop, or error.

In operation 810, the interface server 750 may receive an HTTP request message via the server module. For example, the interface server 750 may receive the HTTP request message from the instance application server (IAS), a network adaptor (NA), or an external web service (EWS).

In operation 820, the interface server 750 may create a message for obtaining an instance state, and may transfer the message to the message router 710.

In operation 830, the message router 710 may parse the message for obtaining the instance state, and may transfer the parsed message to the instance lifecycle manager 720.

In operation 840, the instance lifecycle manager 720 may refer to registered instance state information, may create a state message about a corresponding instance if the reference of an instance ID succeeds, and conversely, may create an information null message notifying an absence of instance information if the reference of the instance ID fails. For example, a state message may include a state value, such as run, suspend, stop, or error.

In operation 850, the interface server 750 may provide a response to the HTTP request message via the server module. For example, the interface server 750 may provide the created state message or information null message as a response to the HTTP request message via the server module.

Figure 9:
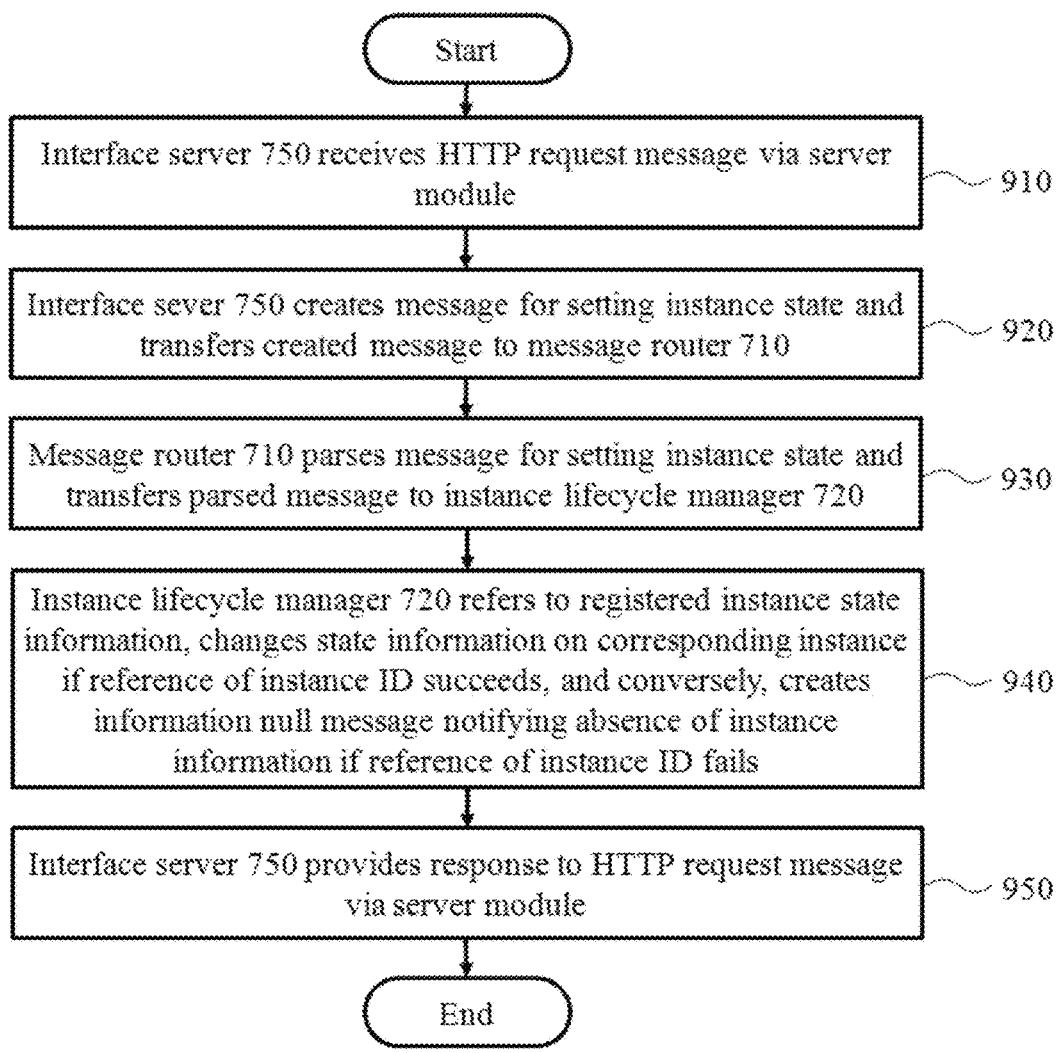
FIG. 9 is a flowchart illustrating an instance state control function according to an embodiment of the present invention.

FIG. 9 is a flowchart illustrating an instance state control function according to an embodiment of the present invention. Hereinafter, the instance state control function is described with reference to FIGS. 7 and 9. The instance application server may use the instance state control function in order to change a state of an individual instance. In response to a message transferred based on ID information of an instance of which a state is to be changed, the instance lifecycle manager 720 may change the state of the corresponding instance. Here, the state of the corresponding instance may be changeable to a state of run, suspend, or stop.

In operation 910, the interface server 750 may receive an HTTP request message via the server module. For example, the interface server 750 may receive the HTTP request message from the instance application server, the network adaptor, or the external web service.

In operation 920, the interface sever 750 may create a message for setting an instance state and may transfer the created message to the message router 710.

In operation 930, the message router 710 may parse the message for setting the instance state, and may transfer the parsed message to the instance lifecycle manager 720.

In operation 940, the instance lifecycle manager 720 may refer to registered instance state information, may change state information on the corresponding instance if the reference of an instance ID succeeds, and conversely, may create an information null message notifying an absence of instance information if the reference of the instance ID fails. For example, if the reference of the instance ID succeeds, the instance lifecycle manager 720 may change a state of the corresponding instance to one of run, suspend, and stop states in response to the HTTP request message.

In operation 950, the interface server 750 may provide a response to the HTTP request message via the server module. For example, the interface server 750 may provide the response message or the information null message as a response to the HTTP request message via the server module.

Figure 10:
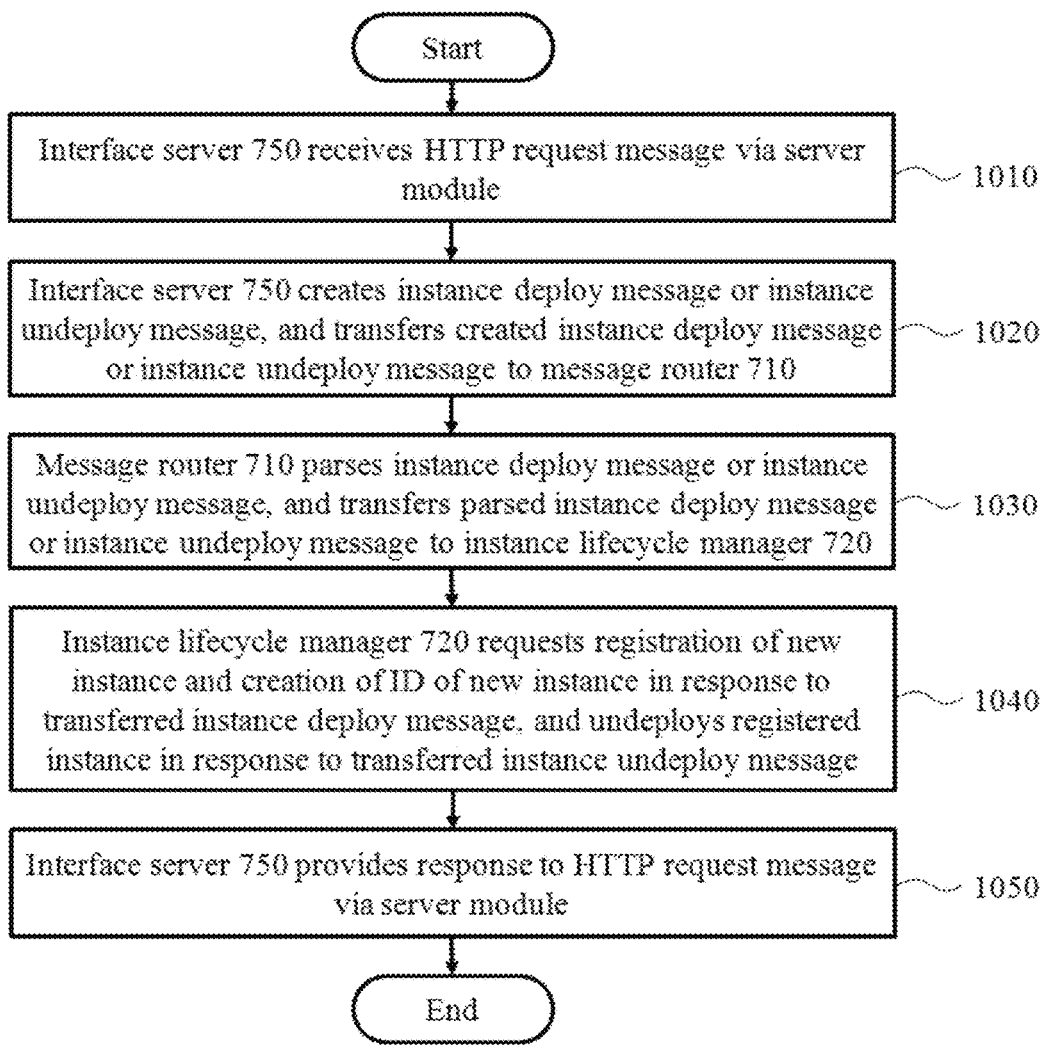
FIG. 10 is a flowchart illustrating an instance deploy control function according to an embodiment of the present invention.

FIG. 10 is a flowchart illustrating an instance deploy control function according to an embodiment of the present invention. Hereinafter, the instance deploy control function is described with reference to FIGS. 7 and 10. The instance application server may use the instance deploy control function in order to deploy a new instance or undeploy an existing instance. In response to a message transferred based on ID information of an instance of which a state is to be changed, the instance lifecycle manager 720 may change the state of the corresponding instance. Here, the undeployed instance may be excluded from the instance pool 730.

In operation 1010, the interface server 750 may receive an HTTP request message via the server module. For example, the interface server 750 may receive the HTTP request message from the instance application server, the network adaptor, or the external web service.

In operation 1020, the interface server 750 may create an instance deploy message or an instance undeploy message, and may transfer the created instance deploy message or instance undeploy message to the message router 710.

In operation 1030, the message router 710 may parse the instance deploy message or the instance undeploy message, and may transfer the parsed instance deploy message or instance undeploy message to the instance lifecycle manager 720.

In operation 1040, the instance lifecycle manager 720 may request registration of a new instance and creation of an ID of the new instance in response to the transferred instance deploy message, and may undeploy a registered instance in response to the transferred instance undeploy message. Here, a request for registering the new instance and creating the ID of the new instance may be transferred to the instance pool 730. When the new instance is created in the instance pool 730, an ID of the created instance may be returned to the instance lifecycle manager 720. If the reference of the instance ID succeeds as a result of referring to registered instance state information for undeploying the corresponding instance, the instance lifecycle manager 720 may change the state of the corresponding instance to a stop state, and may delete information on the registered instance.

In operation 1050, the interface server 750 may provide a response to the HTTP request message via the server module. For example, when a new instance is created in response to the instance deploy message, the interface server 750 may provide a message including an ID of the created new instance. Also, when an instance is undeployed in response to the instance undeploy message, the interface server 750 may provide a message notifying that the corresponding message is undeployed. Also, when an instance to be undeployed is not registered to the instance lifecycle manager 720, the interface server 750 may provide an information null message notifying an absence of instance information.

Figure 11:
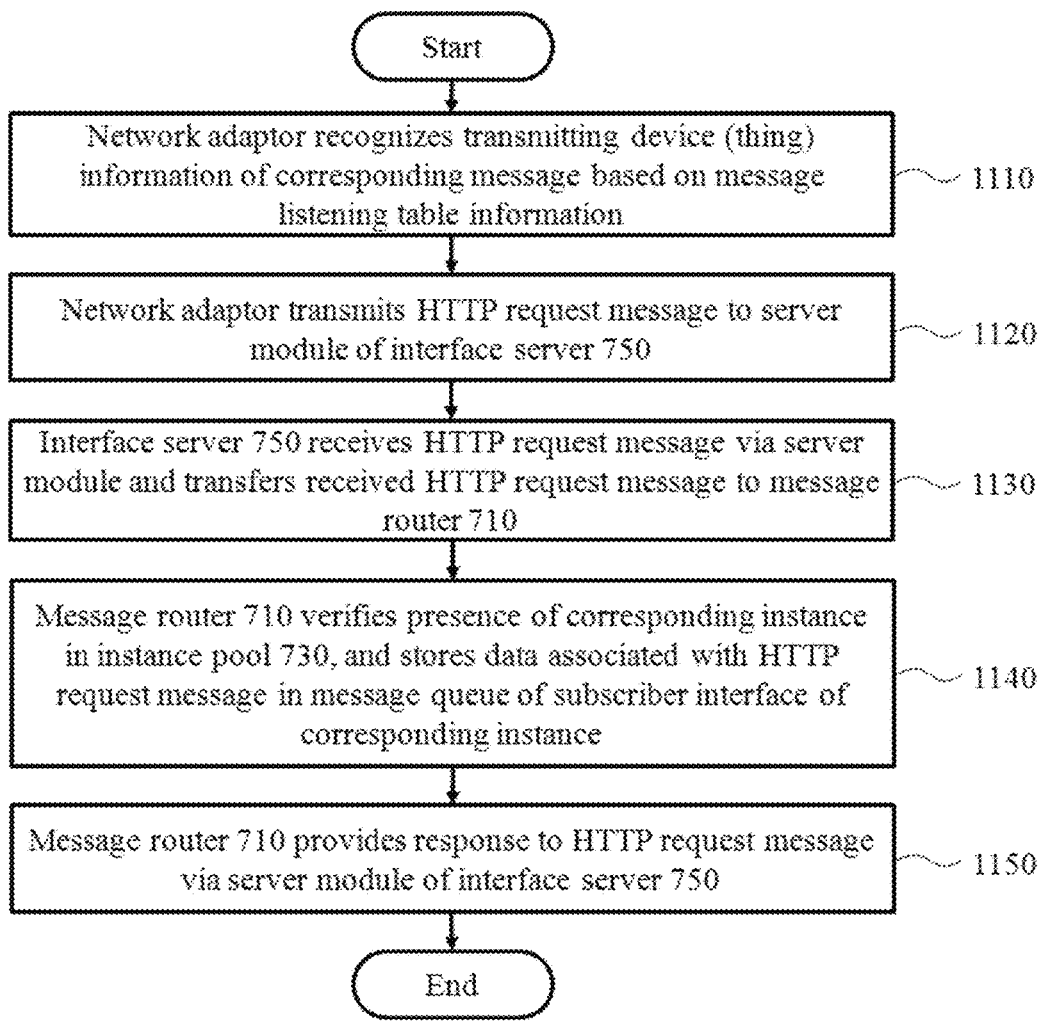
FIG. 11 is a flowchart illustrating a thing feed control function according to an embodiment of the present invention.

FIG. 11 is a flowchart illustrating a thing feed control function according to an embodiment of the present invention. Hereinafter, the thing feed control function is described with reference to FIGS. 7 and 11. The thing feed control function may provide a function for dispatching a message of a thing received from the network adaptor to a predetermined instance. In response to a message received from the network adaptor using the server module, the interface server 750 may transfer the received message to the message router 710 using an HTTP request method, and may transfer a response message to the network adaptor. The message router 710 may add the message received from the server module of the interface server 750, on a corresponding instance feed using a separate thread, and may register a schedule to an instance scheduler of the instance lifecycle manager 720 so that instances being subscribed to may be called using a trigger.

In operation 1110, the network adaptor may recognize transmitting device, for example, thing, information of a corresponding message based on message listening table information. For example, the network adaptor may obtain a required instance ID by recognizing information on a thing that transmits the message through a message listening table.

In operation 1120, the network adaptor may transmit an HTTP request message to the server module of the interface server 750.

In operation 1130, the interface server 750 may receive the HTTP request message via the server module, and may transfer the received HTTP request message to the message router 710.

In operation 1140, the message router 710 may verify a presence of the corresponding instance in the instance pool 730, and may store data associated with the HTTP request message in a message queue of a subscriber interface of the corresponding instance.

In operation 1150, the message router 710 may provide a response to the HTTP request message via the server module of the interface server 750.

Figure 12:
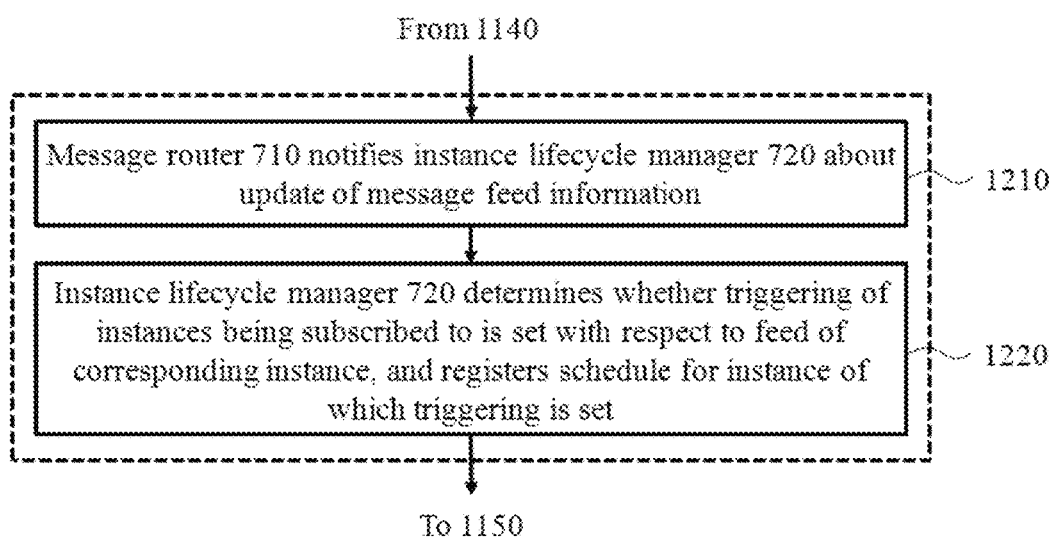
FIG. 12 is a flowchart illustrating a schedule registration method according to an embodiment of the present invention.

FIG. 12 is a flowchart illustrating a schedule registration method according to an embodiment of the present invention. Operations of the schedule registration method according to the present embodiment may be included between operations 1140 and 1150 of FIG. 11.

In operation 1210, the message router 710 may notify the instance lifecycle manager 720 about update of message feed information.

In operation 1220, the instance lifecycle manager 720 may determine whether triggering of instances being subscribed to is set with respect to a feed of a corresponding instance, and may register a schedule for an instance of which triggering is set. For example, a schedule to be registered may include a schedule for immediately running the instance.

In operation 1150 of FIG. 11, when the schedule for the instance of which triggering is set is present, the message router 710 may provide, as a response, a message notifying that a message from a device, for example, a thing is applied to the instance in response to the HTTP request message received from the network adaptor. Conversely, when the schedule for the instance of which triggering is set is absent, the message router 710 may provide, as a response, a message notifying an absence of the corresponding instance.

Figure 13:
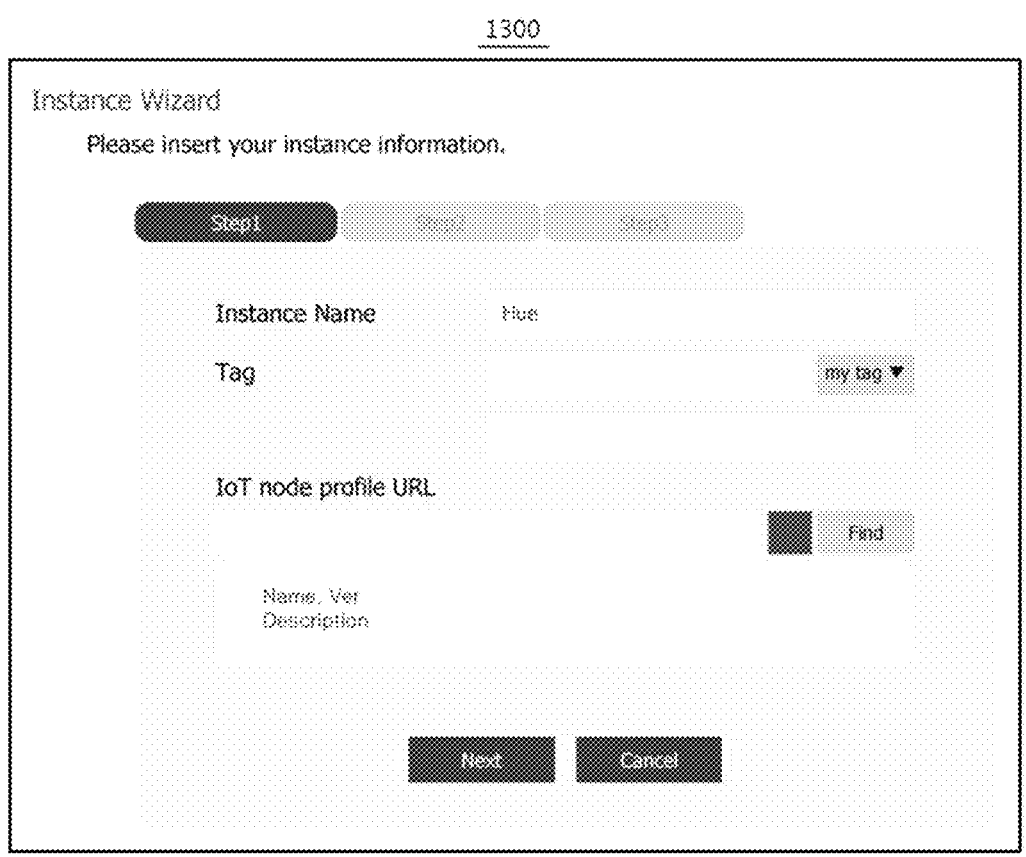
FIGS. 13 through 15 are diagrams illustrating examples of an instance wizard according to an embodiment of the present invention.
Figure 14:
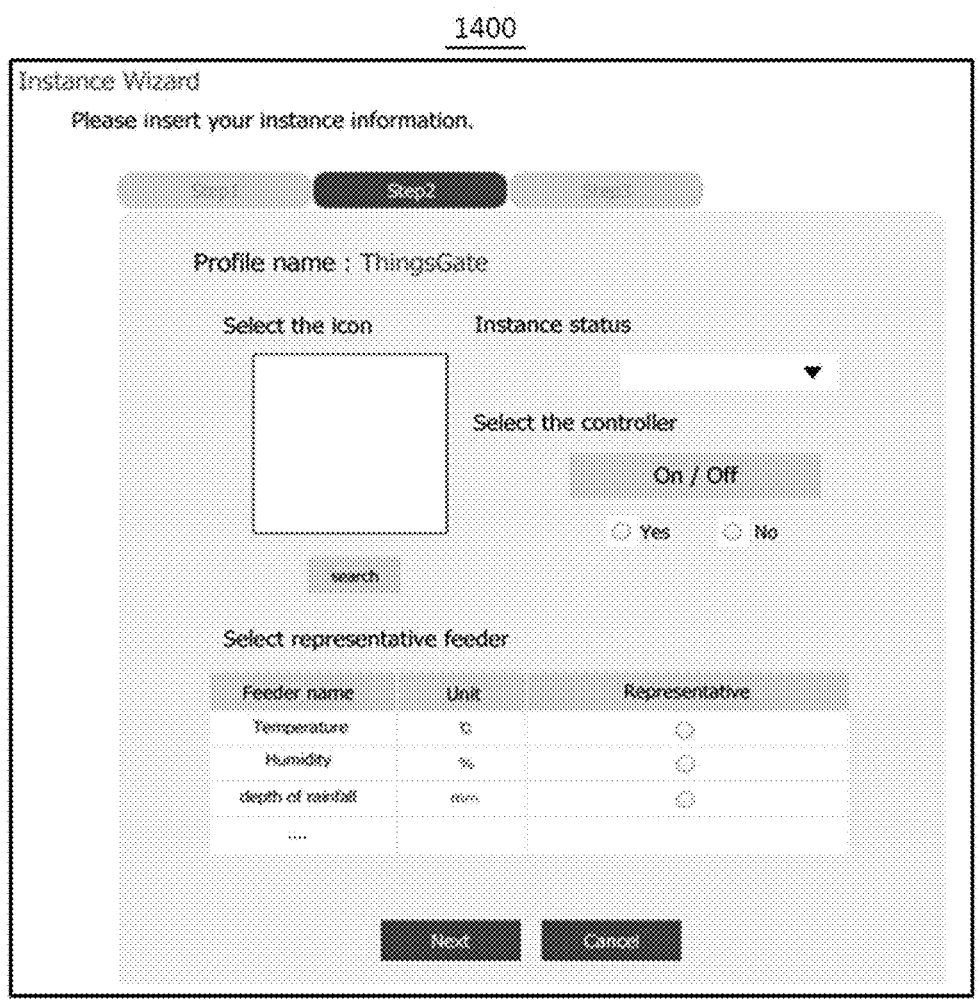
Figure 15:
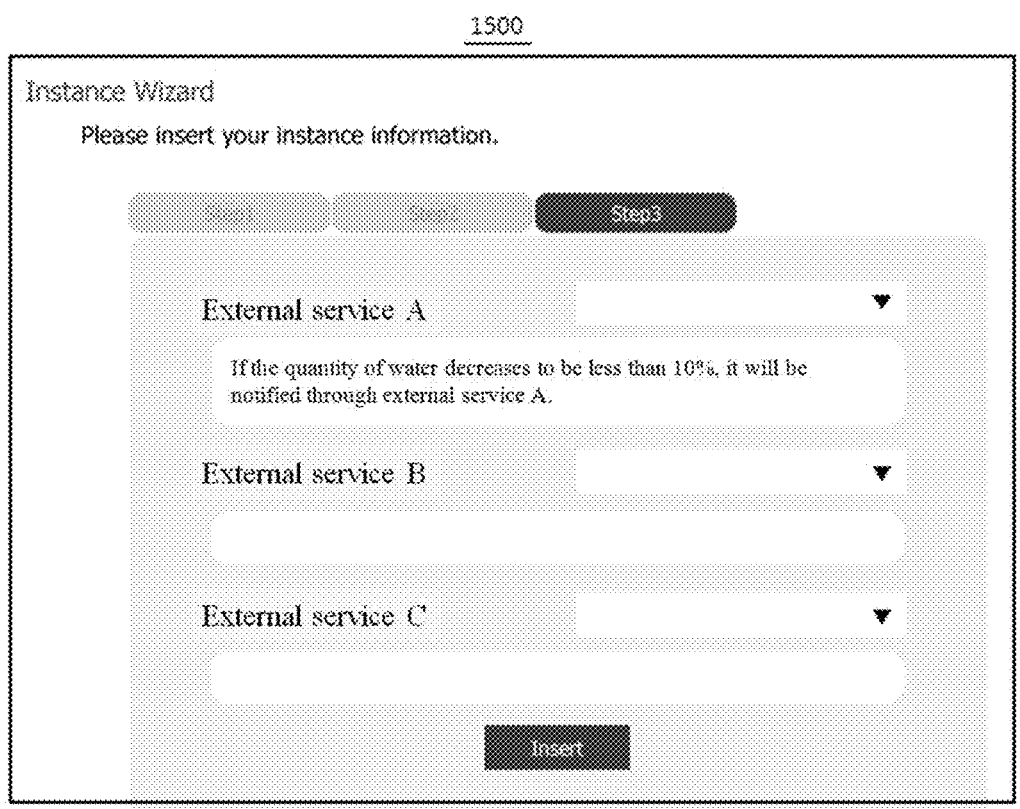

FIGS. 13 through 15 are diagrams illustrating examples of an instance wizard according to an embodiment of the present invention.

A first step of inputting instance information using an instance wizard provided via a web is displayed on a first screen 1300. In the first step, information such as a name of an instance, tag, and a URL at which a profile of an IoT node is stored may be input.

A second step of inputting instance information using an instance wizard provided via a web is displayed on a second screen 1400. In the second step, a user interface for selecting an instance icon, a user interface for selecting a state of an instance, a user interface for selecting a controller, and a user interface for selecting a unit of a representative value may be provided. A user may input a variety of instance information using the provided user interfaces.

A third step of inputting instance information using an instance wizard provided via a web is displayed on a third screen 1500. In the third step, information used to be provided with information satisfying a condition through an external service associated with a user may be set.

For example, information on the quantity of water set through the first screen 1300 based on a URL of a profile may be detected at the IoT node. The IoT node may transmit a message including information on the quantity of water to an instance manager via the network adaptor. In this example, as described above with reference to FIGS. 11 and 12, the message may be processed and running of the instance may be scheduled. As displayed on the third screen 1500, if the quantity of water is less than 10%, a notification may be provided through an external service A. In this case, a data type about a rate to satisfy the condition "less than 10%" may be set on the second screen 1400.

Figure 16:
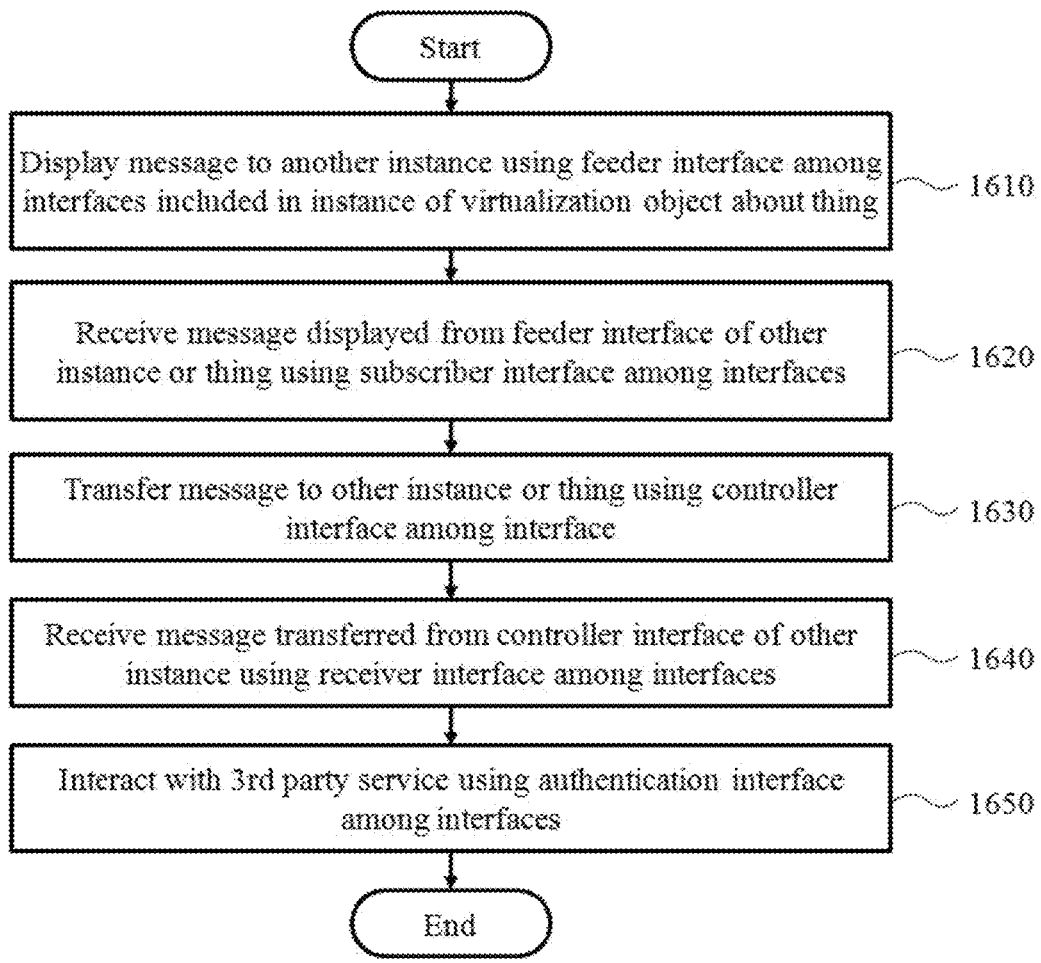
FIG. 16 is a flowchart illustrating a service method according to an embodiment of the present invention.

FIG. 16 is a flowchart illustrating a service method according to an embodiment of the present invention. A service method in an IoT environment according to the present embodiment may be performed by a service system including at least one storage unit and at least one processor. At least one program may be stored in the at least one storage unit, and operations included in the service method may be performed according to a control of the at least one program.

In operation 1610, the service system may display a message to another instance using a feeder interface among interfaces included in an instance of a virtualization object about a thing. For example, the service system may display the message by storing the message in a message queue created for each ID of a feeder, using the feeder interface.

In operation 1620, the service system may receive a message displayed from a feeder interface of the other instance or the thing using a subscriber interface among the interfaces. For example, the service system may receive the message by reading the message stored in the message queue using the subscriber interface.

Here, whether the instance is to subscribe to a message of the other instance may be set via a filter element of the subscriber interface. In this case, the message stored in the message queue may be immediately transferred to the instance based on whether the instance is to subscribe to the message, or may be transferred as an input value when running the instance based on a running period of the instance. For example, when the instance is set to subscribe to the message, the message stored in the message queue may be immediately transferred to the corresponding instance via an instance manager and may be used to run the instance. Conversely, when the instance is set not to subscribe to the message, the message stored in the message queue may be transferred to the corresponding instance as an input value for running the instance via the instance manager when the instance is to be run based on a running period.

Also, to receive the message from the thing, information on a physical interface used to receive the message may be stored in advance via an information element associated with the thing. Here, the subscriber interface of the instance may receive the message from the thing based on the stored information on the physical interface. An example of information on the physical interface is described above with reference to Table 10.

In operation 1630, the service system may transfer a message to the other instance or the thing using a controller interface among the interface. Here, information on a receiver interface of the other instance may be set via a filter element of the controller interface, and the controller interface may transfer the message to the other instance based on information on the receiver interface set in the filter element.

In operation 1640, the service system may receive a message transferred from a controller interface of the other instance using a receiver interface among the interfaces. In response to receiving the message using the receiver interface, an operation associated with the message may be executed regardless of a running period of the instance.

In operation 1650, the service system may interact with a 3rd party service using an authentication interface among the interfaces. Here, authentication information on different accounts of different 3rd party services or an identical 3rd party service may be settable for each instance.

Operations of the service method according to the present embodiment may be performed based on a single instance and may also be performed non-sequentially depending on embodiments. For example, based on a first instance, when a message is transferred to the first instance via a controller interface of a second instance, the service system may initially perform operation 1640 for message reception at the first instance. Also, when a message associated with the first instance is displayed via a feeder interface of a third instance, the service system may initially perform operation 1620 for message reception at the first instance. Also, the service system may initially perform operation 1610 to display a message at the first instance.

Figure 17:
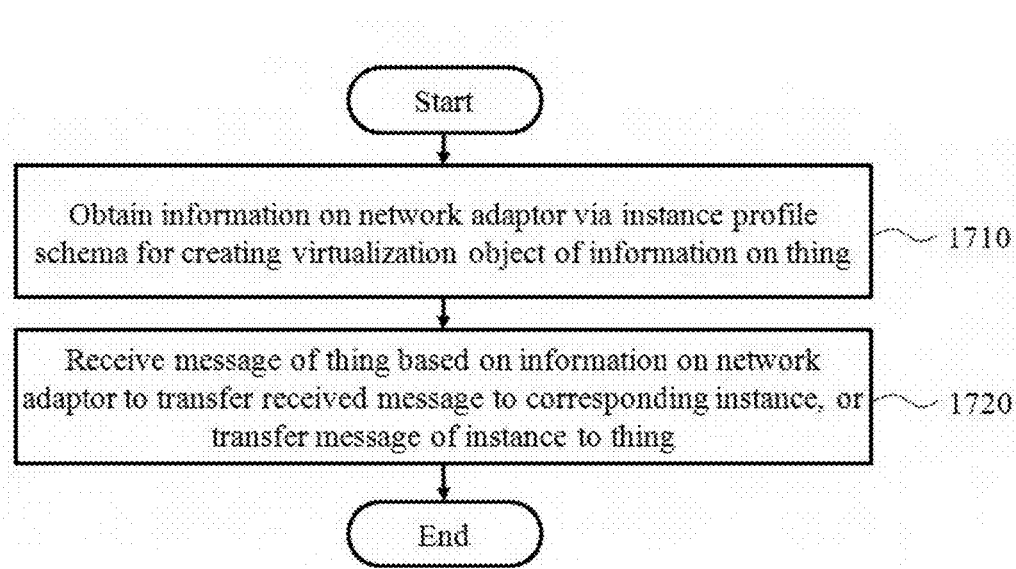
FIG. 17 is a flowchart illustrating a service method according to another embodiment of the present invention.

FIG. 17 is a flowchart illustrating a service method according to another embodiment of the present invention. The service method according to the present embodiment may be performed by a service system including at least one storage unit storing at least one program and at least one processor. Here, operations included in the service method may be performed by the at least one processor according to a control of the at least one program.

In operation 1710, the service system may obtain information on a network adaptor via an instance profile schema for creating a virtualization object of information on a thing.

In operation 1720, the service system may receive a message of the thing based on information on the network adaptor to transfer the received message to a corresponding instance, or may transfer a message of the instance to the thing. Receiving the message of the thing may be processed via a subscriber interface of the instance, and transferring the message to the thing may be processed via a controller interface of the instance.

For example, the instance profile schema may include information on the thing, information on the instance, and information on the network adaptor. In detail, information on the thing may include information on at least one of a name of the thing, a representative image of the thing, and additional information of the thing. Also, information on the instance may include information on at least one of a tag of the instance, an ID of the instance, a version of the instance, a location at which information on the instance is included, a physical location of a representative icon to be used after registering the instance, and a running period of the instance. Also, information on the network adaptor may include information on at least two of a communication protocol to be substantially used for interaction between the thing and the instance, a destination MAC address used to transmit the message of the thing, an IP address value of the thing, a TCP port value of the thing, a destination TCP port value used to transmit the message of the thing, a UDP port value of the thing, a destination UDP port value used to transmit the message of the thing, and an address value to be used for an HTTP message communication method.

As another example, information on the network adaptor may include information used to connect to the subscriber interface of the instance and information on a physical interface used for interaction between the thing and the instance.

Figure 18:
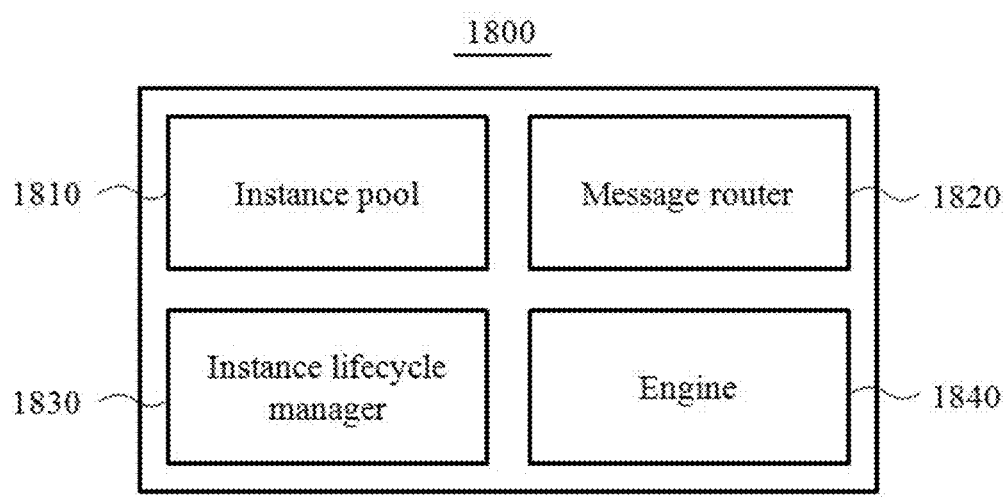
FIG. 18 is a block diagram illustrating an internal configuration of a service system according to another embodiment of the present invention.

FIG. 18 is a block diagram illustrating an internal configuration of a service system 1800 according to another embodiment of the present invention. Referring to FIG. 18, the service system 1800 according to the present embodiment may include an instance pool 1810, a message router 1820, an instance lifecycle manager 1830, and an engine 1840.

The instance pool 1810 may store information on an instance of a virtualization object on a thing. For example, in response to deploying an instance, information on the instance may be stored in the instance pool 1810.

The message router 1820 may route a message of the instance to provide the routed message to the instance lifecycle manager 1830, or to store the routed message in a message queue associated with the instance.

The instance lifecycle manager 1830 may manage a lifecycle of the instance, and may schedule running of the instance based on the message.

The engine 1840 may provide a running environment of the instance.

The message of the instance may be received in response to a request from an instance application server, a network adaptor, or an external web service.

Figure 19:
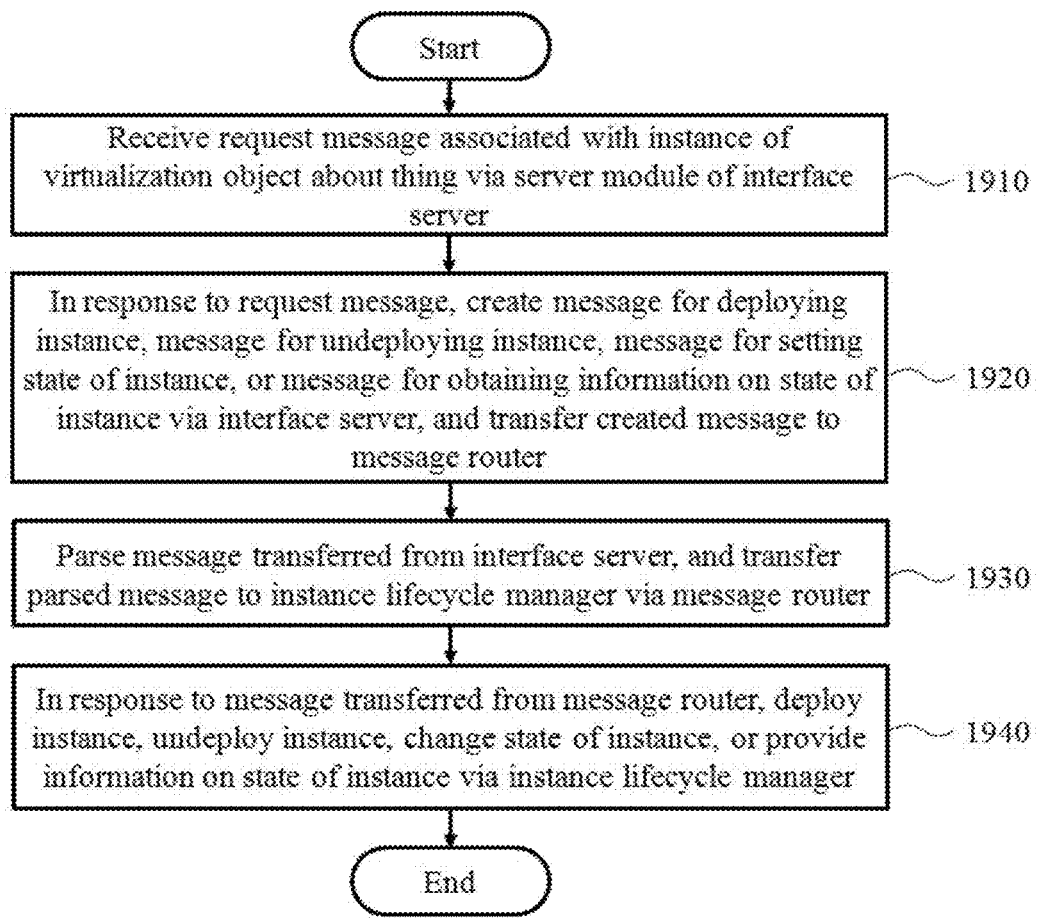
FIG. 19 is a flowchart illustrating a service method according to still another embodiment of the present invention.

FIG. 19 is a flowchart illustrating a service method according to still another embodiment of the present invention. The service method according to the present embodiment may be performed by a service system including at least one storage unit storing at least one program and at least one processor. Here, operations included in the service method may be performed by the at least one processor according to a control of the at least one program.

In operation 1910, the service system may receive a request message associated with an instance of a virtualization object about a thing via a server module of an interface server. Here, the request message may be received in response to an HTTP request from an instance application server, a network adaptor, or an external web service.

In operation 1920, in response to the request message, the service system may create a message for deploying an instance, a message for undeploying the instance, a message for setting a state of the instance, or a message for obtaining information on the state of the instance via the interface server, and may transfer the created message to a message router.

For example, the state of the instance may include at least one of run, stop, and suspend states. The state of the instance may be changed by controlling a representative value of the instance.

In operation 1930, the service system may parse the message transferred from the interface server, and may transfer the parsed message to an instance lifecycle manager via the message router.

In operation 1940, in response to the message transferred from the message router, the service system may deploy the instance, may undeploy the instance, may change the state of the instance, or may provide information on the state of the instance via the instance lifecycle manager.

Here, the message associated with deploying the instance, undeploying the instance, changing the state of the instance, or information on the state of the instance may be provided as a response to the request message via the server module of the interface server.

Figure 20:
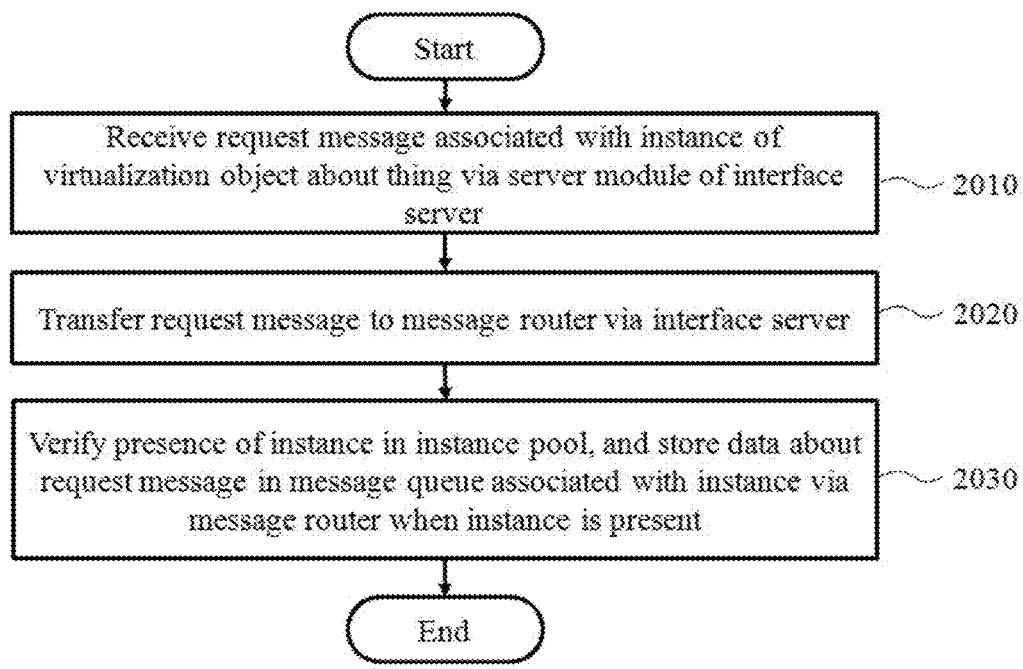
FIG. 20 is a flowchart illustrating a service method according to still another embodiment of the present invention.

FIG. 20 is a flowchart illustrating a service method according to still another embodiment of the present invention. The service method according to the present embodiment may be performed by a service system including at least one storage unit storing at least one program and at least one processor. Here, operations included in the service method may be performed by the at least one processor according to a control of the at least one program.

In operation 2010, the service system may receive a request message associated with an instance of a virtualization object about a thing via a server module of an interface server. Here, the request message may be received at the interface server via a network adaptor in response to a request of the thing.

In operation 2020, the service system may transfer the request message to a message router via the interface server.

In operation 2030, the service system may verify a presence of the instance in an instance pool, and may store data about the request message in a message queue associated with the instance via the message router when the instance is present.

Here, data stored in the message queue may be transferred to the instance via the subscriber interface of the instance. Information on a physical interface used to receive the message may be stored in advance via an information element associated with the thing. The subscriber interface may receive the request message from the thing based on information on the physical interface.

Figure 21:
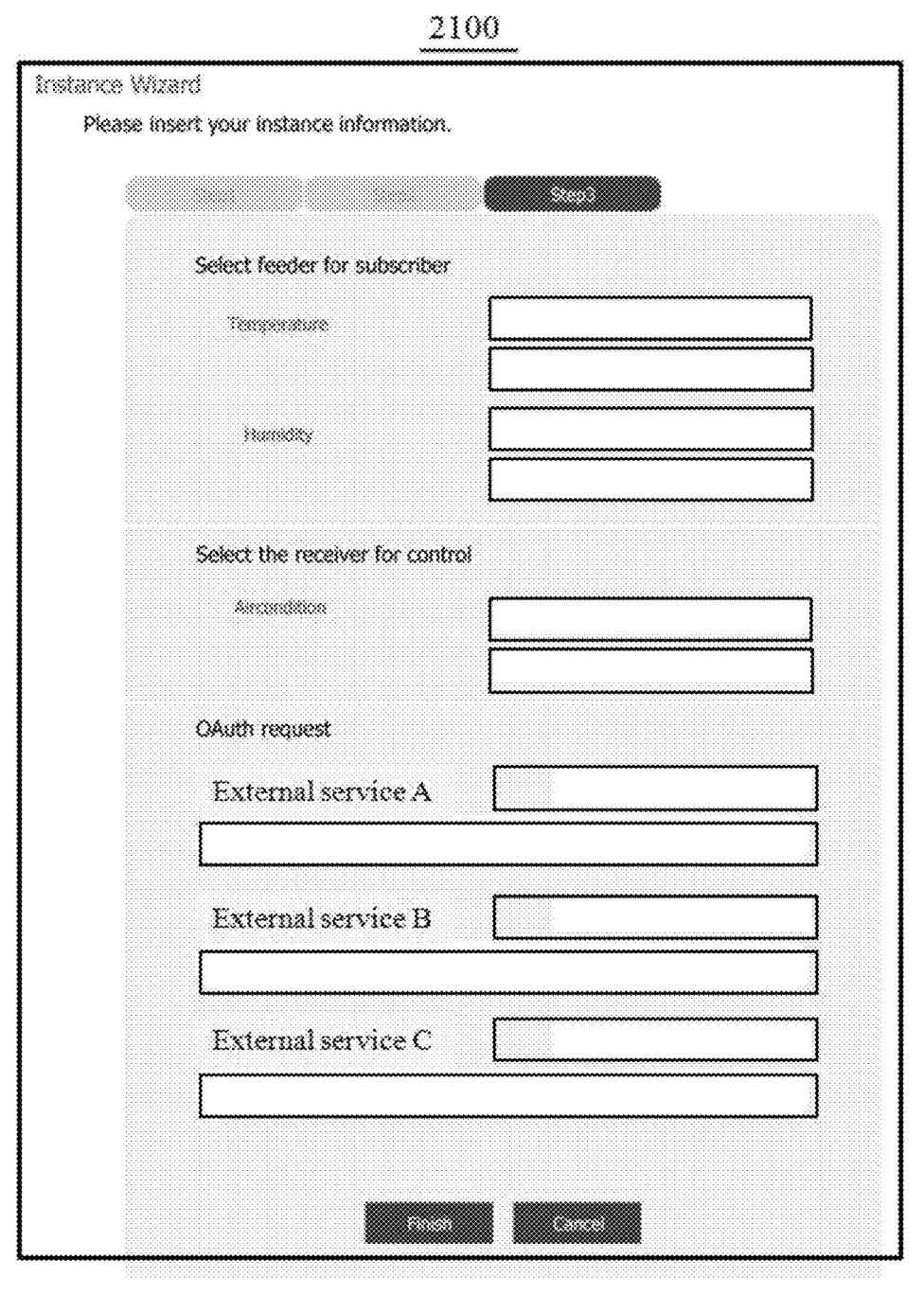

FIG. 21 is a diagram illustrating an example of an additional setting for a mashup instance and an external service authentication request according to still another embodiment of the present invention. The mashup instance may process interaction between instances. Accordingly, for the mashup instance, an interface for selecting a feeder interface for a subscriber interface based on a representative value of a sensor side and an interface for selecting a receiver interface for a controller interface based on a representative of a control device side are displayed on a screen 2100. Also, the mashup instance may process an interaction between an instance and an external service. Accordingly, an interface for an authentication request (OAuth request) to the external service is displayed on the screen 2100.

Figure 22:
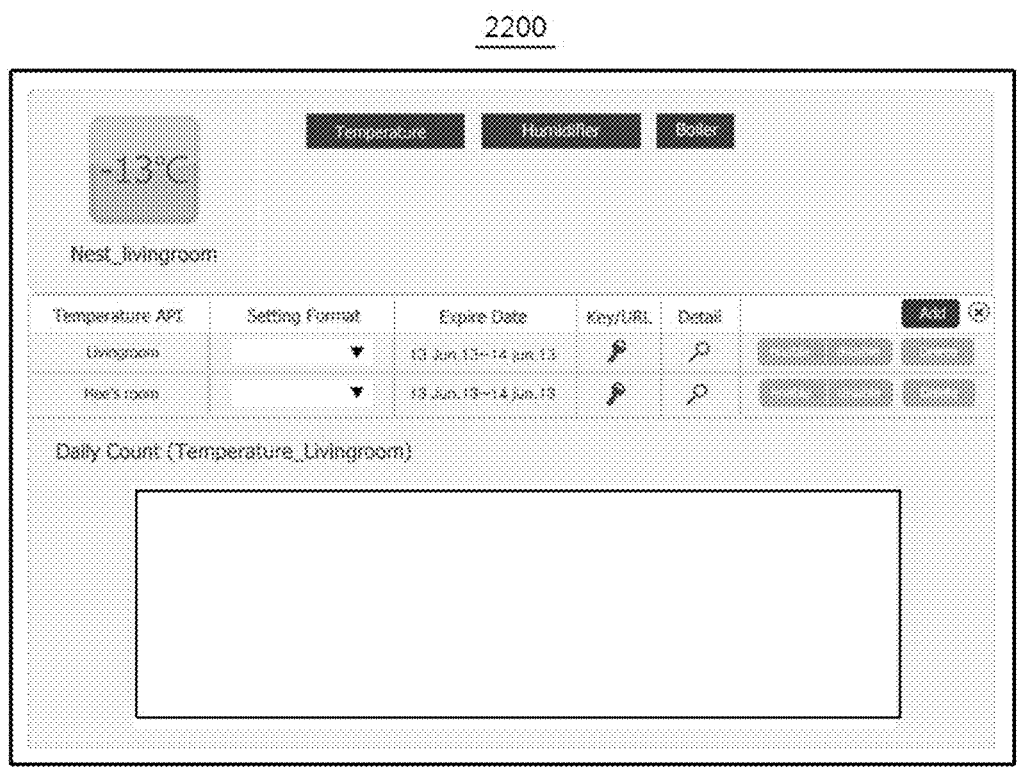
FIG. 22 is a diagram illustrating an example of an open Application Program Interface (API) according to still another embodiment of the present invention.

FIG. 22 is a diagram illustrating an example of an open API according to still another embodiment of the present invention. An interface for setting an open API with respect to values to be displayed via a feeder interface of an instance is displayed on a screen 2200. For example, an interface for setting an open API with respect to an instance of each of 'Livingroom' and 'Hee's room' is displayed on the screen 2200. As described above, the feeder interface may read a message received from a device, for example, a thing and then may transfer the read message to another service, for example, an external service. A function associated with processing of the instance may be provided in an API format to the external service. A description document for the open API to be provided to the external service may be provided. A URL of the description document may be provided as expressed as the following Table 11.

TABLE 11 http://$userID$.instancehosting.com/instanceId/$instanceID$/description.html
* Variables are identified by indicating them as '$'.

An interface for inputting the URL of the description document may be provided on the screen 2200.

Figure 23:
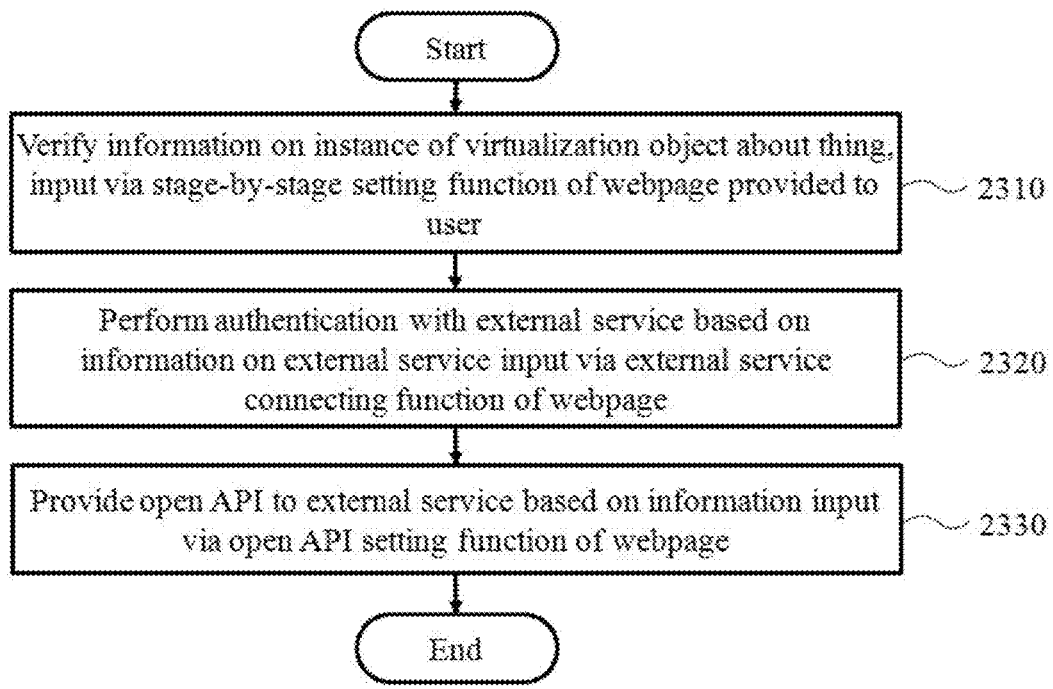
FIG. 23 is a flowchart illustrating a service method according to still another embodiment of the present invention.

FIG. 23 is a flowchart illustrating a service method according to still another embodiment of the present invention. The service method according to the present embodiment may be performed by a service system including at least one storage unit storing at least one program and at least one processor. Here, operations included in the service method may be processed by the at least one processor according to a control of the at least one program.

In operation 2310, the service system may verify information on an instance of a virtualization object about a thing, input via a stage-by-stage setting function of a webpage provided to a user. For example, the stage-by-stage setting function may display, by stages, a plurality of user interfaces among a user interface for receiving a name of an instance, a user interface for receiving a tag of the instance, a user interface for receiving a URL in which a profile of an IoT node is stored, a user interface for selecting an instance icon, a user interface for selecting a state of the interface, a user interface for selecting a controller, and a user interface for selecting a unit of a representative value.

In operation 2320, the service system may perform authentication with an external service based on information on the external service input via an external service connecting function of the webpage. For example, the external service connecting function may include a user interface for receiving account information of a user on the external service.

In operation 2330, the service system may provide an open API to the external service based on information input via an open API setting function of the webpage. For example, the open API setting function may include a user interface for receiving location information including a description document of the open API.

Although not illustrated, the service method according to still another embodiment may further include displaying an icon for each instance via the webpage in addition to operations 2310 through 2330 of FIG. 23. Here, an instance control function and a representative value of a corresponding instance may be displayed on an area on which a corresponding instance icon is displayed. For example, in the case of an instance that outputs temperature, information, such as '23° C.', may be displayed as a representative value. The instance control function may include an ON/OFF setting function or a lock/unlock setting function. Depending on a necessity, a state of the instance may be selectively further displayed on the area. For example, the state of the instance may be displayed based on a color of a state bar.

Also, although not illustrated, the service method according to still another embodiment may further include receiving a request of a user and providing a webpage in response to the request of the user. Here, the webpage may include a stage-by-stage setting function for receiving information on an instance of the virtualization object, an external service connecting function for receiving information on an authentication of an external service, and an open API setting function for receiving information on an open API to be provided to the external service. The service method according to still another embodiment may be performed by a service system including at least one storage unit storing at least one program and at least one processor. Here, operations included in the service method may be processed by the at least one processor according to a control of the at least one program.

Operations included in at least one of the service methods according to the embodiments of FIGS. 17, 19, 20, and 23 may be configured to be further included in the service method of FIG. 16.

According to embodiments of the present invention, it is possible to manage different devices or various services through linkage or convergence therebetween and to provide an integrated service in an Internet of Things (IoT) environment, a Web of Things (WoT) environment, or a Web of Objects (WoO) environment.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A service method in an Internet of Things (IoT) environment, the service method executing on a processor, according to a set of instructions stored on a memory device, to operate an instance of a virtualization object about a thing, the thing being a device, the method comprising:

displaying a message to another instance using a feeder interface, wherein the feeder interface is a first interface among at least five interfaces included in the instance of the virtualization object about the thing;

receiving a message displayed from a feeder interface of the other instance or the thing using a subscriber interface, wherein the subscriber interface is a second interface among the at least five interfaces;

transferring a message to the other instance or the thing using a controller interface, wherein the controller interface is a third interface among the at least five interfaces;

receiving a message transferred from a controller interface of the other instance using a receiver interface, wherein the receiver interface is a fourth interface among the at least five interfaces;

interacting with a 3rd party service using an authentication interface, wherein the authentication interface is a fifth interface among the at least five interfaces;

verifying information on the instance of the virtualization object input via a stage-by-stage setting function of a webpage provided to a user;

performing authentication with an external service based on information on the external service input via an external service connecting function of the webpage; and providing an open Application Program Interface (API) to the external service based on information input via an open API setting function of the webpage, wherein the stage-by-stage setting function displays, by stages, a plurality of user interfaces among a user interface for receiving a name of an instance, a user interface for receiving a tag of the instance, a user interface for receiving a universal resource locator (URL) in which a profile of an IoT node is stored, a user interface for selecting an instance icon, a user interface for selecting a state of the interface, a user interface for selecting a controller, and a user interface for selecting a unit of a representative value.

2. The method of claim 1, wherein:
the displaying comprises storing the message in a message queue created for each identifier of a feeder, using the feeder interface, and
the receiving of the displayed message comprises reading the message stored in the message queue, using the subscriber interface.

3. The method of claim 2, wherein:
whether the instance is to subscribe to a message of the other instance is set via a filter element of the subscriber interface, and
the message stored in the message queue is immediately transferred to the instance based on whether the instance is to subscribe to the message, or is transferred as an input value when running the instance based on a running period of the instance.

4. The method of claim 1, wherein information on a physical interface used to receive the message is stored in advance via an information element associated with the thing, and
the subscriber interface receives the message from the thing based on information on the physical interface.

5. The method of claim 1, wherein in response to receiving the message using the receiver interface, an operation associated with the message is executed regardless of a running period of the instance.

6. The method of claim 1, wherein:
information on a receiver interface of the other instance is set via a filter element of the controller interface, and
the controller interface transfers the message to the other instance based on information on the receiver interface set in the filter element.

7. The method of claim 1, wherein authentication information on different accounts of different 3rd party services or an identical 3rd party service is settable for each instance.

8. The method of claim 1, further comprising:
obtaining information on a network adaptor via an instance profile schema for creating the virtualization object; and
receiving the message of the thing based on information on the network adaptor to transfer the received message to a corresponding instance or transferring the message of the instance to the thing.

9. The method of claim 8, wherein the instance profile schema comprises information on the thing, information on the instance, and information on the network adaptor.

10. The method of claim 8, wherein information on the network adaptor comprises information used to connect to the subscriber interface of the instance and information on a physical interface used for an interaction between the thing and the instance.

11. The method of claim 1, further comprising:
receiving a request message associated with the instance of the virtualization object via a server module of an interface server;
creating, by the interface server in response to the request message, a message for deploying an instance, a message for undeploying the instance, a message for setting a state of the instance, or a message for obtaining information on the state of the instance, and transferring the created message to a message router;
parsing, by the message router, the message transferred from the interface server, and transferring the parsed message to an instance lifecycle manager; and
deploying, by the instance lifecycle manager, the instance, undeploying the instance, changing the state of the instance, or providing information on the state of the instance in response to the message transferred from the message router.

12. The method of claim 11, wherein the message associated with deploying the instance, undeploying the instance, changing the state of the instance, or information on the state of the instance is provided as a response to the request message via the server module of the interface server.

13. The method of claim 1, further comprising:
receiving a request message associated with the instance of the virtualization object via a server module of an interface server;
transferring, by the interface server, the request message to a message router; and
verifying, by the message router, a presence of the instance in an instance pool, and storing data about the request message in a message queue associated with the instance when the instance is present,
wherein the request message is received by the interface server via a network adaptor in response to a request of the thing.

14. The method of claim 13, wherein data stored in the message queue is transferred to the instance via the subscriber interface of the instance.

15. The method of claim 1, further comprising:
receiving a request of a user; and
providing a webpage in response to the request of the user,
wherein the webpage comprises a stage-by-stage setting function for receiving information on the instance of the virtualization object, an external service connecting function for receiving information on an authentication of an external service; and
an open API setting function for receiving information on an open API to be provided to the external service.

16. A service system in an Internet of Things (IoT) environment, the service system comprising:
at least one storage unit configured to store at least one program; and
at least one processor,
wherein, based on a control of the at least one program, the at least one processor is configured to perform:
a process of displaying a message to another instance using a feeder interface, wherein the feeder interface is a first interface among at least five interfaces included in an instance of a virtualization object about a thing;
a process of receiving a message displayed from a feeder interface of the other instance or the thing using a subscriber interface, wherein the subscriber interface is a second interface among the at least five interfaces;
a process of transferring a message to the other instance or the thing using a controller interface, wherein the controller interface is a third interface among the at least five interfaces;
a process of receiving a message to be transferred from a controller interface of the other instance using a receiver interface, wherein the receiver interface is a fourth interface among the at least five interfaces; and
a process of interacting with a 3rd party service using an authentication interface, wherein the authentication interface is a fifth interface among the at least five interfaces, a process of verifying information on the instance of the virtualization object input via a stage-by-stage setting function of a webpage provided to a user;

a process of performing authentication with an external service based on information on the external service input via an external service connecting function of the webpage; and a process of providing an open Application Program Interface (API) to the external service based on information input via an open API setting function of the webpage, wherein the stage-by-stage setting function displays, by stages, a plurality of user interfaces among a user interface for receiving a name of an instance, a user interface for receiving a tag of the instance, a user interface for receiving a universal resource locator (URL) in which a profile of an IoT node is stored, a user interface for selecting an instance icon, a user interface for selecting a state of the interface, a user interface for selecting a controller, and a user interface for selecting a unit of a representative value.

17. The service system of claim 16, wherein the at least one processor is configured to perform:

a process of storing the message in a message queue created for each identifier of a feeder, using the feeder interface, in order to perform the process of displaying the message to the other instance, and a process of reading the message stored in the message queue, using the subscriber interface in order to process the process of receiving the displayed message.

18. The service system of claim 16, wherein the at least one processor is further configured to perform:

a process of obtaining information on a network adaptor via an instance profile schema for creating the virtualization object; and a process of receiving the message of the thing based on information on the network adaptor to transfer the received message to a corresponding or transferring the message of the instance to the thing.

\* \* \* \* \*